(12) United States Patent
Bassett

(10) Patent No.: US 7,279,800 B2
(45) Date of Patent: Oct. 9, 2007

(54) WASTE OIL ELECTRICAL GENERATION SYSTEMS

(76) Inventor: Terry E. Bassett, 8752 E. Range Rider Trail, Mesa, AZ (US) 85207

(*) Notice: Subject to any disclaimer, the term of this patent is extended or adjusted under 35 U.S.C. 154(b) by 81 days.

(21) Appl. No.: 11/328,816

(22) Filed: Jan. 9, 2006

(65) Prior Publication Data

US 2006/0118065 A1 Jun. 8, 2006

Related U.S. Application Data

(63) Continuation-in-part of application No. 10/705,578, filed on Nov. 10, 2003, now Pat. No. 7,067,933.

(51) Int. Cl.
*B60L 1/02* (2006.01)
*F01K 15/00* (2006.01)
*F02B 63/04* (2006.01)
*F03G 7/08* (2006.01)

(52) U.S. Cl. .......................................... 290/2; 290/1 R

(58) Field of Classification Search ............... 290/2, 290/52, 1 R; 60/39.5, 618, 517, 685, 657, 60/653, 520

See application file for complete search history.

(56) References Cited

U.S. PATENT DOCUMENTS

| | | | |
|---|---|---|---|
| 3,678,284 A | 7/1972 | Peters | |
| 3,696,021 A | 10/1972 | Cole et al. | |
| 3,864,208 A * | 2/1975 | Van Huisen | ............ 376/276 |
| 3,979,904 A * | 9/1976 | Hobbs | ............ 60/790 |
| 4,031,404 A | 6/1977 | Martz et al. | |
| 4,049,299 A | 9/1977 | Rigollot | |
| 4,134,024 A * | 1/1979 | Wiseman | ............ 290/52 |
| 4,161,657 A | 7/1979 | Shaffer, Jr. | |
| 4,369,373 A * | 1/1983 | Wiseman | ............ 290/2 |
| 4,392,353 A | 7/1983 | Shibuya et al. | |
| 4,511,805 A * | 4/1985 | Boy-Marcotte et al. | ............ 290/2 |
| 4,734,139 A | 3/1988 | Shakun et al. | |
| 4,955,359 A | 9/1990 | Briggs et al. | |
| 5,074,114 A * | 12/1991 | Meijer et al. | ............ 60/517 |
| 5,363,836 A | 11/1994 | Briggs | |
| 5,531,212 A | 7/1996 | Smoker et al. | |
| 5,590,526 A | 1/1997 | Cho | |
| 5,707,426 A * | 1/1998 | Kalka et al. | ............ 95/200 |
| 5,790,420 A | 8/1998 | Lang | |
| 5,826,518 A * | 10/1998 | Bhat et al. | ............ 110/216 |
| 5,879,149 A | 3/1999 | Briggs et al. | |
| 6,048,197 A | 4/2000 | Beiler | |
| 6,085,701 A | 7/2000 | Stauffer et al. | |

(Continued)

FOREIGN PATENT DOCUMENTS

| | | |
|---|---|---|
| EP | 1 136 542 | 9/2001 |
| WO | WO 99/40309 | 8/1999 |

*Primary Examiner*—Julio C. Gonzalez
(74) *Attorney, Agent, or Firm*—Stoneman Volk Patent Group; Martin L. Stoneman; Michael D. Volk, Jr.

(57) ABSTRACT

An on-site electrical power generation system utilizing environmentally hazardous waste oils as a combustible fuel. The disclosed invention utilizes environmentally hazardous waste oils generated by one or more on-site processes, such as, for example, by the maintenance of transportation vehicles. In addition, the system is adapted to provide local space heating and hot water as a byproduct of the combustion process.

33 Claims, 7 Drawing Sheets

U.S. PATENT DOCUMENTS

| | | |
|---|---|---|
| 6,132,203 A | 10/2000 | Masin |
| 6,167,691 B1 | 1/2001 | Yoshikawa et al. |
| 6,220,030 B1 | 4/2001 | Clucas et al. |
| 6,484,501 B1 * | 11/2002 | Mieth et al. ............ 60/618 |
| 6,525,431 B1 | 2/2003 | Clucas et al. |
| 6,538,193 B1 | 3/2003 | Fraas |
| 6,663,752 B2 | 12/2003 | Santilli |
| 6,729,246 B2 | 5/2004 | Lo |
| 6,755,901 B1 * | 6/2004 | Ramme et al. ............ 423/237 |
| 6,784,562 B2 | 8/2004 | Gennesseaux |
| 6,857,268 B2 | 2/2005 | Stinger et al. |
| 2003/0213246 A1 | 11/2003 | Coll et al. |

\* cited by examiner

WASTE OIL ELECTRICAL GENERATION SYSTEMS

CROSS-REFERENCE TO RELATED APPLICATION

The present application is a continuation-in-part of related application Ser. No. 10/705,578, filed Nov. 10, 2003, now U.S. Pat. No. 7,067,933, entitled "WASTE OIL ELECTRICAL GENERATION SYSTEMS", and is related to and claims priority from prior provisional application Ser. No. 60/425,605, filed Nov. 12, 2002, entitled "WASTE OIL ELECTRICAL GENERATION SYSTEM", from which priority is claimed, the contents of which are incorporated herein by this reference and are not admitted to be prior art with respect to the present invention by the mention in this cross-reference section.

BACKGROUND

This invention relates to providing an improved electrical generation system utilizing waste oil as a combustible fuel. More particularly, this invention relates to the co-generation of electrical power using a generator powered by the heat energy produced by a waste-oil-fired furnace.

Approximately 1.4 billion gallons of used oil is generated in the United States each year. Approximately ten percent of that amount is properly recycled, with the remainder dumped into the environment. Waste oil dumping has increasingly become a major worldwide environmental issue. It has been shown that one gallon of waste oil can contaminate up to one million gallons of water. Currently, forty percent of the pollution found in the waterways of the United States is created by waste oil, with similar pollution statistics reported by other industrialized countries. In 1980 the U.S. Congress passed the Used Oil Recycling Act to establish a national policy governing used oil. One significant aspect of the legislation was the acceptance of on-site burning of waste oil to produce usable heat. Government leaders recognized that making used oil valuable for hundreds of thousands of small businesses was the best way to prevent dumping and water pollution.

In the United States, the Environmental Protection Agency (EPA) currently acts to establish, monitor and manage waste oil control guidelines in an attempt reduce hazardous environmental waste oil contamination from waste oil dumping. The EPA's rule generally states:

TITLE 40—PROTECTION OF ENVIRONMENT PART 279—STANDARDS FOR THE MANAGEMENT OF USED OIL—Table of Contents Subpart C—Standards for Used Oil Generators Sec. 279.23 On-site burning in space heaters.
Generators may burn used oil in used oil-fired space heaters provided that:
(a) The heater burns only used oil that the owner or operator generates or used oil received from household do-it-yourself used oil generators;
(b) The heater is designed to have a maximum capacity of not more than 0.5 million Btu per hour; and
(c) The combustion gases from the heater are vented to the ambient air.

[57 FR 41612, Sep. 10, 1992, as amended at 58 FR 26425, May 3, 1993]

Efficient burning of waste oil is a relatively complex problem. Typically, the waste oil being burned is a mixture of several oil types, each having unique physical characteristics (such as varying densities and flow viscosities).

There are a number of manufacturers that have developed efficient waste oil burners, currently marketing their products throughout the world. The outputs of the burners are currently limited to hot air for space heating and/or usable hot water. These units are sold to businesses that generate waste (used) oil from their operations. They include businesses, such as automotive repair shops, retail outlets that sell oil to consumers, truck shops, farm equipment, heavy equipment, dealerships, bus fleets, commercial fleets, municipalities, construction and mining companies, recycling and landfill centers, manufacturing facilities, and food production/restaurants. The EPA and CE have approved this type of waste oil burning process without a permit; as long as the EPA's burning criteria are met (as noted above).

Despite the high level of efficiency of current waste oil burners, as much as seventy percent of the combustion heat produced by a unit is lost as exhaust. It is clear that a need exists for an improved waste oil burning system that better utilizes valuable generated heat energy currently lost from existing systems.

OBJECTS OF THE INVENTION

It is a primary object and feature of the present invention to provide an effective, efficient system for on-site combustion of waste oil.

It is another object and feature of the present invention to utilize the heat of such combustion to generate on-site (local) electrical power.

It is a further object and feature of the present invention to provide such a system that incorporates on-site energy conversion apparatus adapted to convert the heat generated by the combustion of such waste oil to mechanical power, and subsequently to such electrical power by means of mechanical generation. It is an additional object and feature of the present invention to utilize a Stirling-cycle engine as the heat-to-mechanical power conversion apparatus. It is another object and feature of the present invention to utilize a steam turbine as the heat-to-mechanical power conversion apparatus. It is an additional object and feature of the present invention to utilize a hydrocarbon vapor turbine as the heat-to-mechanical power conversion apparatus.

It is another object and feature of the present invention to provide such a system that utilizes at least one direct heat-to-electrical power conversion process including the use of thermocouple-based electrical power generators and thermophotovoltaic electrical power generators. It is an additional object and feature of the present invention to generate electrical power from the combustion of waste oil through a thermal gasification process driving an electrical fuel cell.

It is a further object and feature of the present invention to provide such a system that utilizes the combustion energy of the waste oil to provide space heating. It is another object and feature of the present invention to provide such a system that utilizes the combustion energy of the waste oil to provide a usable hot water source.

It is a further object and feature of the present invention to provide such a system that is capable of supplying excess generated electrical power to a larger electrical power grid.

It is a further object and feature of the present invention to provide such a system that is capable of storing excess generated electrical power in a battery storage system.

It is a another object and feature of the present invention to provide such a system that is capable of economically disposing of environmentally-hazardous waste oil.

A further primary object and feature of the present invention is to provide such a system that is efficient, inexpensive and handy. Other objects and features of this invention will become apparent with reference to the following descriptions.

SUMMARY OF THE INVENTION

In accordance with a preferred embodiment hereof, this invention provides a system related to on-site burning of on-site-generated environmentally hazardous waste oils for the purpose of on-site electrical power generation, such system comprising: at least one holder structured and arranged to hold such on-site-generated environmentally hazardous waste oils; at least one combustion heater structured and arranged to produce combustion heat by burning such on-site-generated environmentally hazardous waste oils; at least one waste oil transfer component structured and arranged to transfer such on-site-generated environmentally hazardous waste oils from such at least one holder to such at least one combustion heater; at least one heat energy converter structured and arranged to convert such combustion heat to electrical power; at least one primary heat exchanger structured and arranged to transfer such combustion heat to such at least one heat energy converter; and at least one on-site electrical circuit adapted to utilize the electrical power; wherein such at least one primary heat exchanger is in operational communication with such at least one combustion heater; and wherein such at least one combustion heater comprises: at least one atomizer structured and arranged to atomize such on-site-generated environmentally hazardous waste oils prior to combustion; and at least one igniter adapted to ignite such on-site-generated environmentally hazardous waste oils after such environmentally hazardous waste oils have passed through such at least one atomizer.

Moreover, it provides such a system wherein such at least one heat energy converter comprises at least one thermocouple-based electrical power generator adapted to generate the electrical power utilizing the combustion heat. Additionally, it provides such a system wherein such at least one heat energy converter comprises at least one thermophotovoltaic electrical power generator adapted to generate the electrical power utilizing the combustion heat.

Also, it provides such a system wherein such at least one heat energy converter comprises: at least one heat-driven gasification generator adapted to generate at least one fuel gas utilizing the combustion heat; and at least one fuel cell adapted to generate electrical power utilizing such at least one fuel gas.

In addition, it provides such a system wherein such at least one heat energy converter comprises: at least one heat-to-mechanical power converter adapted to convert such combustion heat to mechanical power; and operationally coupled to such at least one heat-to-mechanical power converter, at least one electrical generator adapted to the generate electrical power. And, it provides such a system wherein such at least one heat-to-mechanical power converter comprises at least one Stirling-cycle engine structured and arranged to use the mechanical output of at least one Stirling cycle to produce mechanical power. Further, it provides such a system wherein such at least one heat-to-mechanical power converter comprises at least one steam powered turbine adapted to convert steam pressure to mechanical power. Even further, it provides such a system wherein such at least one heat-to-mechanical power converter comprises at least one hydrocarbon vapor turbine adapted to convert at least one hydrocarbon vapor pressure to mechanical power.

Moreover, it provides such a system wherein such at least one on-site electrical circuit comprises at least one electrical network connected to at least one larger electrical grid. Additionally, it provides such a system wherein such at least one electrical network further comprises at least one electrical controller structured and arranged to control electrical power within such at least one electrical network. Also, it provides such a system wherein such at least one electrical controller is structured and arranged to control transfers of electrical power between such at least one electrical network and the at least one larger electrical grid. In addition, it provides such a system wherein: such at least one electrical network further comprises at least one electrical storage device structured and arranged to store electrical power; and such at least one electrical controller is structured and arranged to control at least one transfer of electrical power between such at least one electrical storage device and such at least one electrical network.

And, it provides such a system further comprising at least one secondary heat exchanger structured and arranged to transfer at least one portion of the combustion heat to at least one heatable fluid. Further, it provides such a system wherein such at least one secondary heat exchanger is structured and arranged to transfer heat to air, usable for space heating. Even further, it provides such a system wherein the heatable fluid comprises at least one liquid. Moreover, it provides such a system wherein such at least one holder comprises at least one collector structured and arranged to assist in collecting such on-site-generated environmentally hazardous waste oils. Additionally, it provides such a system wherein: such combustion heat produced by such at least one combustion heater comprises at least one directed heat flow; and wherein at least one portion of such at least one primary heat exchanger is positioned to be in thermal communication with such at least one directed heat flow; and wherein such at least one primary heat exchanger is structured and arranged to direct at least one portion of such at least one directed heat flow to at least one portion of such at least one secondary heat exchanger.

Also, it provides such a system wherein such at least one waste oil transfer component comprises: at least one pump to pump such on-site-generated environmentally hazardous waste oils from such at least one holder to such at least one combustion heater; at least one flow volume regulator adapted to regulate the flow volume of such on-site-generated environmentally hazardous waste oils pumped from such at least one holder to such at least one combustion heater; and at least one pre-heater structured and arranged to preheat such environmentally hazardous waste oils prior to burning. In addition, it provides such a system wherein: such at least one combustion heater comprises a maximum capacity of not more than 0.5 million BTU input per hour; and combustion gasses produced by the combustion of such on-site-generated environmentally hazardous waste oils are substantially vented to the ambient air.

In accordance with another preferred embodiment hereof, this invention provides a system related to on-site burning of on-site-generated environmentally hazardous waste oils for the purpose of on-site electrical power generation, such system comprising: at least one holder structured and arranged to hold such on-site-generated environmentally hazardous waste oils; at least one combustion heater structured and arranged to produce combustion heat by burning such on-site-generated environmentally hazardous waste oils; at least one waste oil transfer component structured and arranged to transfer such on-site-generated environmentally hazardous waste oils from such at least one holder to such at least one combustion heater; at least one heat energy converter structured and arranged to convert such combustion heat to electrical power; and at least one primary heat exchanger structured and arranged to transfer such combustion heat to such at least one heat energy converter; wherein such at least one holder comprises at least one collector structured and arranged to assist in on-site collecting of such on-site-generated environmentally hazardous waste oils; wherein such at least one waste oil transfer component comprises at least one pump to pump such on-site-generated environmentally hazardous waste oils from such at least one holder to such at least one combustion heater, at least one flow volume regulator adapted to regulate the flow volume of such on-site-generated environmentally hazardous waste oils pumped from such at least one holder to such at least one combustion heater, and at least one pre-heater structured and arranged to preheat such environmentally hazardous waste oils prior to burning; wherein such at least one primary heat exchanger is in operational communication with such at least one combustion heater; and wherein such at least one combustion heater comprises: at least one atomizer structured and arranged to atomize such on-site-generated environmentally hazardous waste oils prior to combustion; and at least one igniter adapted to ignite such on-site-generated environmentally hazardous waste oils after such environmentally hazardous waste oils have passed through such at least one atomizer. And, it provides such a system further comprising: at least one secondary heat exchanger structured and arranged to transfer at least one portion of the combustion heat to at least one heatable fluid; wherein such combustion heat produced by such at least one combustion heater comprises at least one directed heat flow; wherein at least one portion of such at least one primary heat exchanger is positioned to be in thermal communication with such at least one directed heat flow; wherein such at least one primary heat exchanger is structured and arranged to direct at least one portion of such at least one directed heat flow to at least one portion of such at least one secondary heat exchanger.

Further, it provides such a system further comprising at least one on-site electrical circuit adapted to utilize the electrical power. Even further, it provides such a system wherein: such at least one on-site electrical circuit comprises at least one electrical network connected to at least one larger electrical grid; such at least one electrical network comprises at least one electrical controller structured and arranged to control electrical power within such at least one electrical network; and such at least one electrical controller is structured and arranged to control transfers of electrical power between such at least one electrical network and the at least one larger electrical grid. Moreover, it provides such a system wherein: such at least one electrical network further comprises at least one electrical storage device structured and arranged to store electrical power; and such at least one electrical controller is structured and arranged to control at least one transfer of electrical power between such at least one electrical storage device and such at least one electrical network.

Additionally, it provides such a system wherein such at least one heat energy converter comprises at least one thermocouple-based electrical power generator adapted to generate the electrical power utilizing the combustion heat. Also, it provides such a system wherein such at least one heat energy converter comprises: at least one thermophotovoltaic electrical power generator adapted to generate the electrical power utilizing the combustion heat. In addition, it provides such a system wherein such at least one heat energy converter comprises: at least one heat-driven gasification generator adapted to generate at least one fuel gas utilizing the combustion heat; and at least one fuel cell adapted to generate electrical power utilizing such at least one fuel gas.

And, it provides such a system wherein such at least one heat energy converter comprises: at least one heat-to-mechanical power converter adapted to convert such combustion heat to mechanical power; and operationally coupled to such at least one heat-to-mechanical power converter, at least one electrical generator adapted to the generate electrical power. Further, it provides such a system wherein such at least one heat-to-mechanical power converter comprises at least one Stirling-cycle engine structured and arranged to use the mechanical output of at least one Stirling cycle to produce mechanical power. Even further, it provides such a system wherein such at least one heat-to-mechanical power converter comprises at least one steam powered turbine adapted to convert steam pressure to mechanical power. Even further, it provides such a system wherein such at least one heat-to-mechanical power converter comprises at least one hydrocarbon vapor turbine adapted to convert at least one hydrocarbon vapor pressure to mechanical power.

Furthermore, it provides such a system wherein such at least one secondary heat exchanger is structured and arranged to transfer heat to air, usable for space heating. Even further, it provides such a system wherein the heatable fluid comprises at least one liquid.

In accordance with another preferred embodiment hereof, this invention provides a method, related to on-site burning of on-site-generated environmentally hazardous waste oils for the purpose of on-site electrical power generation comprising the steps of: establishing at least one on-site process to generate such on-site-generated environmentally hazardous waste oils; collecting such on-site-generated environmentally hazardous waste oils; producing combustion heat by burning such environmentally hazardous waste oils in at least one on-site combustion heater; and producing on-site electrical power by converting such combustion heat to electrical power. Even further, it provides such a method further comprising the steps of: establishing at least one connection to at least one larger electrical grid; and selling at least one portion of such on-site electrical power by way of such at least one larger electrical grid. Even further, it provides such a method further comprising the step of using such combustion heat for on-site heating uses. Even further, it provides such a method further comprising the step of using such electrical power for at least one on-site electrical use. Furthermore, it provides such a method further comprising the steps of: providing at least one on-site electrical storage device structured and arranged to store at least one portion of such electrical power; and storing at least one portion of such electrical power within such at least one on-site electrical storage device. Even further, it provides such a method further comprising the initial step of collecting such environmentally hazardous waste oils from at least one off-site, non-commercial, waste oil source. Even further, it provides such a method wherein such at least one on-site process comprises the step of performing at least one on-site maintenance service on at least one transportation vehicle to generate such on-site-generated environmentally hazardous waste oils.

DETAILED DESCRIPTION OF A PREFERRED EMBODIMENT OF THE INVENTION

Figure 1:
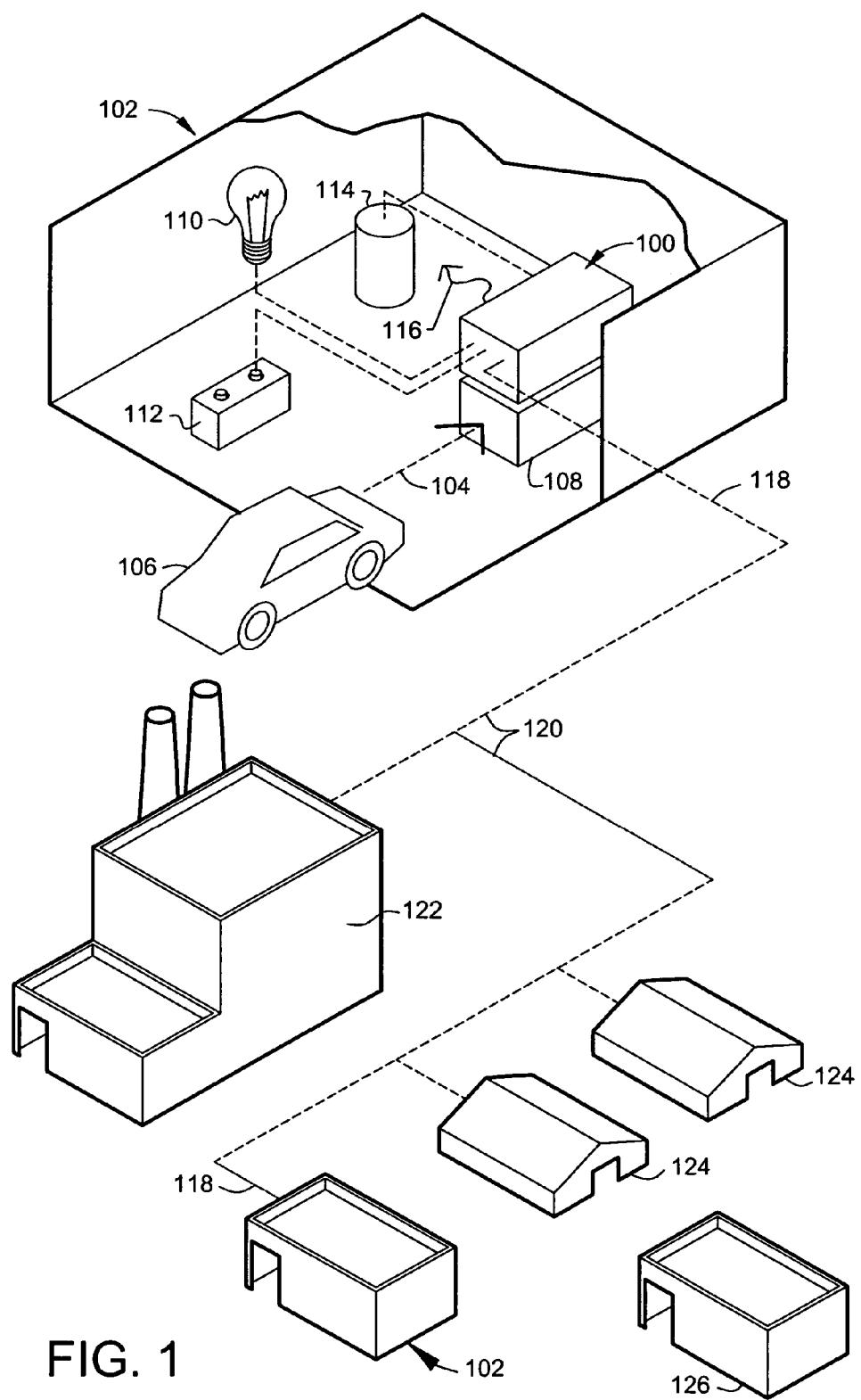
FIG. 1 is a diagrammatic perspective view, illustrating in general, a typical organization of waste oil distributed cogeneration sites linked to a larger electrical power grid, as well as remote waste oil electrical generation sites independent from a larger power distribution system, according to a preferred embodiment of the present invention.

FIG. 1 is a diagrammatic perspective view, illustrating in general, a typical organization of distributed cogeneration site(s) 102 linked to a larger electrical power grid 120, as well as remote waste oil electrical cogeneration site(s) 126, independent from a larger power distribution system, according to a preferred embodiment of the present invention.

The enlarged cut-away view of distributed cogeneration site 102 (in the upper portion of FIG. 1) illustrates, in general, the preferred operational and mechanical arrangements that make up a distributed cogeneration site utilizing waste oil generated on-site as a source of useable energy. In the present disclosure the term "on-site" shall include in the definition the taking place or located at a site comprising waste oil cogeneration system 100. Preferably, a significant portion of the on-site electrical power 110 used within the local electrical network of distributed cogeneration site 102 (at least embodying herein at least one electrical network structured and arranged to utilize electrical power) is produced by waste oil cogeneration system 100, as shown. Waste oil cogeneration system 100 is especially well-suited for use within sites that regularly generate waste oil, such as motor vehicle service shops, fleet maintenance facilities, "quick-lube" shops, and other operations that service, repair or dispose of materials that contain quantities of synthetic or refined crude oil (at least embodying herein at least one power producing site having at least one such electrical circuit, and at least one on-site process to generate such on-site-generated environmentally hazardous waste oils and further at least embodying herein wherein such at least one on-site process comprises the step of performing at least one on-site maintenance service on at least one transportation vehicle to generate such on-site-generated environmentally hazardous waste oil). Under appropriate circumstances, a distributed cogeneration site may collect waste from external, non-commercial sources, such as individuals undertaking "do-it-yourself" vehicle maintenance (at least embodying herein wherein the at least one on-site process comprises collection of the waste oil from at least one non-commercial source).

For the purpose of illustration within the present disclosure, distributed cogeneration site 102 of FIG. 2 produces waste oil through the service and maintenance of transportation vehicles such as motor vehicle 106, as shown. Waste oil 104 collected from the on-site service and maintenance of motor vehicle 106 is preferably transferred to a waste oil collection tank 108 (at least embodying herein at least one holder structured and arranged to hold on-site-generated environmentally hazardous waste oils produced by the at least one on-site process), preferably incorporated within waste oil cogeneration system 100, as shown. Preferably, waste oil 104 is burned, in controlled manner, within waste oil cogeneration system 100 to produce usable heat energy.

Preferably, the term "cogeneration" refers to the simultaneous production of usable heat and on-site electrical power 110. In a preferred embodiment of the present invention, waste oil cogeneration system 100 is configured as a multi-generation unit, producing electrical power, hot air 116 (for space-heating) and hot water 114 (at least embodying herein wherein such at least one secondary heat exchanger is structured and arranged to transfer heat to air, usable for space heating; and wherein the heatable fluid comprises at least one liquid), as shown.

Distributed cogeneration site 102 may preferably include an energy storage system 112 to permit added flexibility in the timing and frequency of external electrical power purchases and increased reliability to the overall electrical supply features of the system. To control initial implementation and long-term maintenance costs, energy storage system 112 preferably comprises a conventional battery storage system, as shown (at least embodying herein wherein such at least one electrical network further comprises at least one electrical storage device structured and arranged to store electrical power). Upon reading this specification, those with ordinary skill in the art will understand that, under appropriate circumstances, such as commercial availability, user preference, advances in technology, etc., other storage systems, such as, for example, super capacitors, Superconducting Magnetic Energy Storage (SMES) systems, flywheels and Compressed Air Energy Storage (CAES) systems, may suffice.

Preferably, distributed cogeneration site(s) 102 located near or within an external electrical power distribution system, such as larger electrical power grid 120, include at least one electrical grid connection 118 (at least embodying herein wherein such at least one on-site electrical circuit comprises at least one electrical network connected to at least one larger electrical grid), as shown. Preferably, distributed cogeneration site 102 supplies any excess electrical power generated by waste oil cogeneration system 100 to larger electrical power grid 120, via electrical grid connection 118, as shown. Similarly, electrical grid connection 118 allows distributed cogeneration site 102 to draw electrical power from central generating plant 122, via larger electrical power grid 120, in circumstances where the overall power demand of distributed cogeneration site 102 exceeds the generation capacity of waste oil cogeneration system 100. The term "distributed cogeneration", as described within the present disclosure, refers to a decentralization of electrical power generation from traditional large "utility" scale generation sites (such as central generating plant 122) to a combination of conventional large scale generation sites functioning in conjunction with a "near-demand" distribution of smaller, "on-site" electrical generators, as shown. While central generating plant 122 continues to provide most of the power to larger electrical power grid 120, the distributed cogeneration site(s) 102 are, under appropriate circumstances, able to supply power to other local power users during times of peak demand, as shown.

In another highly-preferred application of the present invention, waste oil cogeneration system 100 is used to supply electrical power and usable heat energy to remote waste oil electrical cogeneration site 126, as shown. Waste oil electrical cogeneration site 126 is located such that connection to larger electrical power grid 120 is impossible or otherwise impractical. In the case of remote waste oil electrical cogeneration site 126, waste oil cogeneration system 100 preferably supplies all electrical power and at least some mechanical heating to the site.

Thus, in accordance with preferred embodiments of the present invention, there is provided, related to on-site burning of on-site-generated environmentally hazardous waste oils for the purpose of on-site electrical power generation, a method comprising the preferred steps of: establishing at least one on-site process to generate such on-site-generated environmentally hazardous waste oils; collecting such on-site-generated environmentally hazardous waste oils; producing combustion heat by burning such environmentally hazardous waste oils in at least one on-site combustion heater; and producing on-site electrical power by converting such combustion heat to electrical power. And further comprising the steps of: establishing at least one connection to at least one larger electrical grid; and selling at least one portion of such on-site electrical power by way of such at least one larger electrical grid. Even further, it provides such a method comprising the step of using such combustion heat for on-site heating uses. Even further, it provides such a method further comprising the step of using such electrical power for at least one on-site electrical use. Furthermore, it provides such a method comprising the steps of: providing at least one on-site electrical storage device structured and arranged to store at least one portion of such electrical power; and storing at least one portion of such electrical power within such at least one on-site electrical storage device. Even further, it provides such a method comprising the initial step of collecting such environmentally hazardous waste oils from at least one off-site, non-commercial, waste oil source. And, it provides such a method wherein such at least one on-site process comprises the step of performing at least one site maintenance service on at least one transportation vehicle to generate such on-site-generated environmentally hazardous waste oils.

Figure 2A:
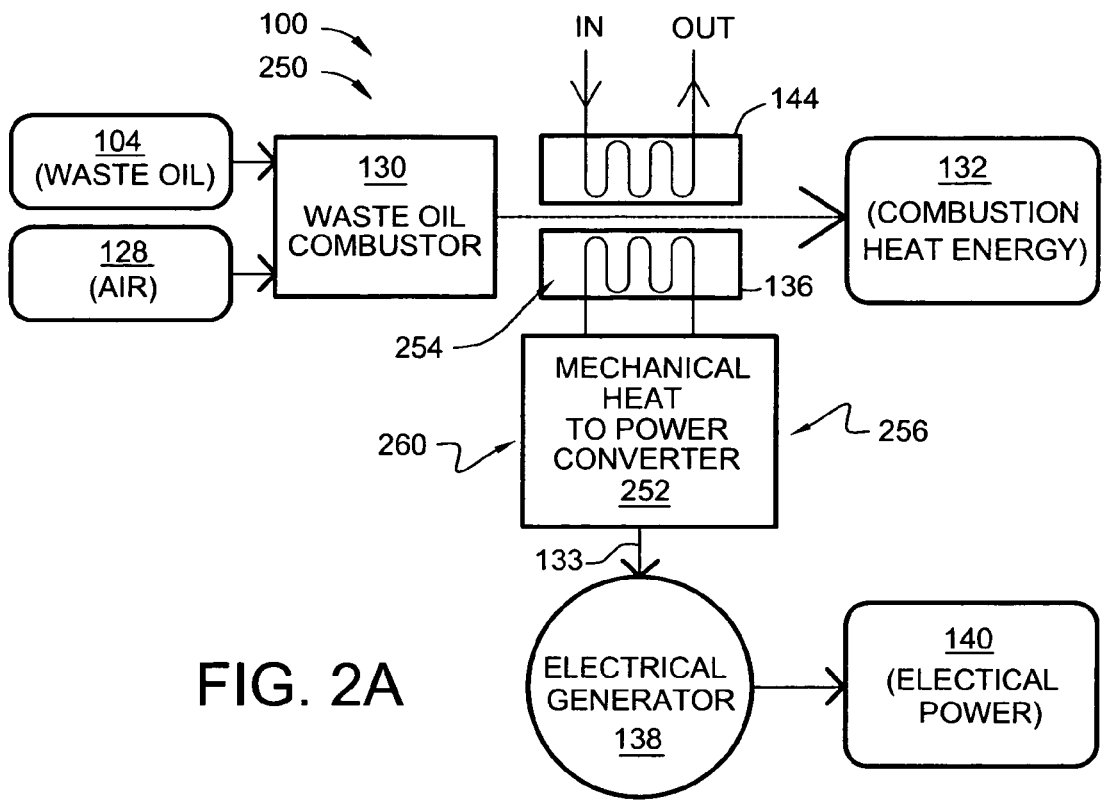
FIG. 2A is a diagrammatic illustration of the principal components of a waste oil cogeneration system based on a heat-to-mechanical power converter according to a preferred embodiment of the present invention.

FIG. 2A is a diagrammatic illustration of the principal components of waste oil co-generator 250 of waste oil cogeneration system 100 based on heat-to-mechanical power converter 252 in combination with electrical generator 138 according to a preferred embodiment of the present invention. Preferably, waste oil co-generator 250 contains at least one waste oil combustor 130 (at least embodying herein at least one combustion heater structured and arranged to produce combustion heat by burning such on-site-generated environmentally hazardous waste oils) that combines waste oil 104 with compressed air 128 to form a highly combustible atomized air/fuel mixture. Igniting the atomized mixture of waste oil 104 and compressed air 128 generates combustion heat energy 132, as shown.

A primary function of waste oil electrical cogeneration system 100 is the conversion of combustion heat energy 132 into electrical power 140, as shown. The conversion of combustion heat energy 132 into electrical power by waste oil co-generator 250 (at least embodying herein at least one heat energy converter structured and arranged to convert such combustion heat to electrical power) is accomplished through a multi-step process. Preferably, working fluid heat exchanger 136 (at least embodying herein at least one primary heat exchanger structured and arranged to transfer such combustion heat to such at least one heat energy converter) is brought into thermal relationship with combustion heat energy 132 (at least embodying herein at least one primary heat exchanger structured and arranged to transfer such combustion heat), enabling the transfer of heat from combustion heat energy 132 to heat-to-mechanical power converter 252, as shown. Preferably, heat-to-mechanical power converter 252 is arranged to convert the heat transferred by working fluid heat exchanger 136 into mechanical energy 133 (e.g., torque within a rotating output shaft), as shown. Preferably, heat-to-mechanical power converter 252 is operationally coupled to electrical generator 138, which then converts mechanical energy 133 into electrical power 140.

As previously described, waste oil electrical cogeneration system 100 is preferably a cogeneration (or multi-generation) unit wherein secondary energy, in the form of usable heat, is derived from the system. In the example of FIG. 2A, secondary fluid heat exchanger 144 (at least embodying herein at least one secondary heat exchanger structured and arranged to transfer at least one portion of the combustion heat to at least one heatable fluid; wherein such at least one secondary heat exchanger is structured and arranged to transfer heat to air, usable for space heating; and wherein the heatable fluid comprises at least one liquid) is brought into thermal relationship with combustion heat energy 132, drawing usable heat from combustion heat energy 132, as shown.

Preferably, heat-to-mechanical power converter 252 (at least embodying herein at least one heat energy converter structured and arranged to convert such combustion heat to electrical power) comprises at least one commercially available heat-to-mechanical power conversion device, such as, for example, a steam turbine, hydrocarbon vapor turbine, or Stirling-cycle engine. Upon reading the teachings of this specification, those of ordinary skill in the art will now understand that, under appropriate circumstances, considering such issues as intended use, advances in technology, etc., other heat-to-mechanical energy conversion prime movers, such as, for example, gas turbines operating by direct interaction with the combustion stream, use of Tesla-type disk turbines, engines utilizing alternate thermal fluids such as helium, etc., may suffice.

Steam driven embodiments of the present invention (embodiments of heat-to-mechanical power converter 252 incorporating one or more steam turbines as the prime mover driving electrical generator 138), preferably comprise a functional combination of one or more commercially available steam generators 254 adapted to supply steam to one or more commercially available steam turbines 256, as shown. Preferably, combustion heat energy 132 is transferred from steam generators 254 of working fluid heat exchanger 136 to steam turbines 256 through high-pressure steam that in turn powers steam turbines 256 coupled to electrical generator 138, as shown.

Preferably, working fluid heat exchanger 136 comprises steam generator 254, as shown. Preferably, steam generator 254 comprises a heating coil-type boiler, preferably utilizing a water-tube boiler arrangement with forced circulation. Such heating coil boilers preferably comprise a spirally wound construction of steel tubes similar in structure and arrangement to the boiler embodiment of FIG. 9. Preferably, the heating coil boiler system comprises all accessory apparatus (as required by the supplier/manufacturer) necessary to provide a complete and operable system. Upon reading the teachings of this specification, those of ordinary skill in the art will now understand that, under appropriate circumstances, considering such issues as intended use, boiler design, etc., the utilization of additional functional components, such as, for example, feedwater tanks, condensers, feedwater pumps, separators/accumulators, control valves, pressure bypass circuits, temperature monitors, etc., may suffice. Preferably, steam generators adaptable for use within working fluid heat exchanger 136 include commercially available systems produced by Clayton Industries of El Monte, Calif., U.S.A. (website URL: www.claytonindustries.com).

The thermodynamic cycle for steam turbine 256 is the Rankine cycle. Preferably, in the steam cycle, water is first pumped to medium to high pressure. It is then heated by steam generator 254 of working fluid heat exchanger 136 to the boiling temperature, and is most preferably superheated (heated to a temperature above that of boiling). Preferably, steam turbine 256 expands the pressurized steam to lower pressure and the steam is then exhausted to a condenser. The condensate from the condenser returns to a feedwater pump for continuation of the cycle. Preferably, steam turbine 256 comprises a set of stationary blades (nozzles) and a moving set of adjacent blades (rotor blades) situate within a sealed casing. The two sets of blades cooperate such that the steam turns the shaft of the turbine and the connected load (electrical generator 138), as shown.

Preferably, a wide array of commercially available turbine designs are adaptable for use as steam turbine 256, with a single stage, single casing design being preferred for reliability and cost. Preferably, steam turbine 256 comprises an output of about 160 HP, a maximum speed of about 3,600 RPM, an inlet input of up to 650 PSIG, 775° F., and exhaust output of up to about 101 psig. Preferably, steam turbines adaptable for use as steam turbine 256 include small format GLT turbines produced by the Dresser-Rand Company of Olean, N.Y.

Other preferred embodiments of heat-to-mechanical power converter 252 preferably comprise systems incorporating one or more vaporized hydrocarbon turbines 260 adapted to utilize vaporized hydrocarbon, rather than steam, to generate mechanical power. Such systems preferably utilize a pressurized light hydrocarbon medium with propane and propylene being most preferred. The advantage of vaporized hydrocarbon systems over steam systems is the lower operational combustion temperatures required to vaporize the above-mentioned hydrocarbon compounds. This has a distinct and sometimes preferred advantage in enabling embodiments of heat-to-mechanical power converter 252 where restricted combustion temperatures are desired or mandated by law. Preferably, working fluid heat exchanger 136 (at least embodying herein at least one primary heat exchanger structured and arranged to transfer such combustion heat to such at least one heat energy converter) is adapted to vaporize a light hydrocarbon liquid to produce a pressurized vapor circuited to vaporized hydrocarbon turbine 260, as shown. The system preferably comprises a hermetic process comprising a closed loop cycle. It is noted that the configuration and operation of such vaporized hydrocarbon turbine devices are described in greater detail in, for example, U.S. Pat. No. 6,857,268 to Stinger et al., incorporated herein by reference for further examples of implementation engineering. Commercially available vaporized hydrocarbon turbines suitable for adaptation and use as vaporized hydrocarbon turbine 260 are produced by WOW Energy, Inc. of Houston, Tex.

Figure 2B:
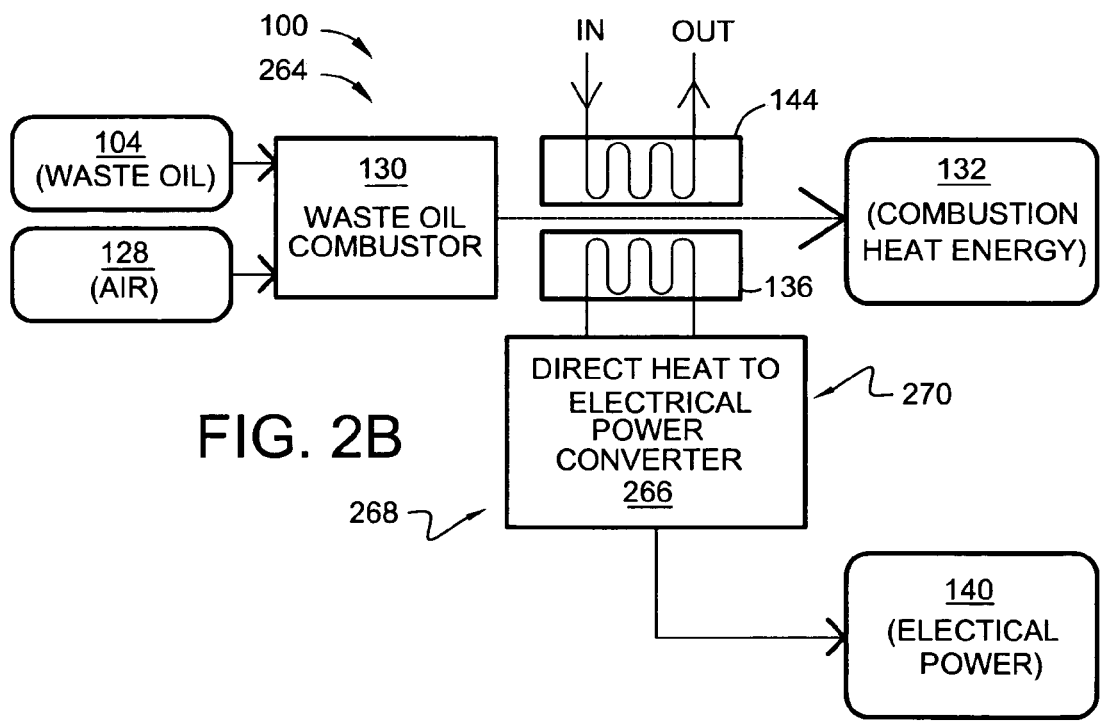
FIG. 2B is a diagrammatic illustration of the principal components of a waste oil cogeneration system based on a direct heat-to-electrical power converter according to a preferred embodiment of the present invention.

FIG. 2B is a diagrammatic illustration of the principal components of an alternate waste oil co-generator 264 (at least embodying herein at least one heat energy converter structured and arranged to convert such combustion heat to electrical power) of waste oil cogeneration system 100 based on direct heat-to-electrical power converter 266 according to a preferred embodiment of the present invention. Preferably, direct heat-to-electrical power converter 266 omits the mechanical conversion and electrical generation steps of FIG. 2A by converting combustion heat energy 132 substantially directly to electrical energy. Preferably, waste oil co-generator 264 contains at least one waste oil combustor 130 (at least embodying herein at least one combustion heater structured and arranged to produce combustion heat by burning such on-site-generated environmentally hazardous waste oils) that combines waste oil 104 with compressed air 128 to form a highly combustible atomized air/fuel mixture. Igniting the atomized mixture of waste oil 104 and compressed air 128 generates combustion heat energy 132, as shown.

Preferably, direct heat-to-electrical power converter 266 comprises at least one direct heat-to-electrical power device, such as, for example, thermocouple-based electrical power generators and thermophotovoltaic electrical power generators. Upon reading the teachings of this specification, those of ordinary skill in the art will now understand that, under appropriate circumstances, considering such issues as cost, advances in technology, etc., other direct electrical generation arrangements, such as, for example, thermionic conversion, pyroelectric conversion, magnetohydrodynamic conversion, electrogasdynamic conversion, etc., may suffice.

Preferred embodiments of direct heat-to-electrical power converter 266 comprising thermocouple-based electrical power generator 268 preferably utilize the Seebeck effect to generate electrical power from combustion heat energy 132. This preferably involves utilizing the properties of a thermocouple, which comprise two electrical conductors of different materials joined at both ends. If the junctions are maintained at different temperatures, an electric current is generated and flows through the conductors. By coupling a large number of thermocouples in series, most preferably thermocouples of a semi-conductor-type, electrical power 140 (comprising a sizeable current) can be generated. It is noted that the configuration and operation of such thermocouple-based electrical power generator devices are described in greater detail in, for example, U.S. Pat. No. 4,734,139 to Shakun et al., incorporated herein by reference for further examples of implementation engineering. Preferably, working fluid heat exchanger 136 (at least embodying herein at least one primary heat exchanger structured and arranged to transfer such combustion heat to such at least one heat energy converter) comprises a plurality of heat absorbing fins adapted to collect combustion heat energy 132 used to drive the generation of electrical power 140 by thermocouple-based electrical power generator.

Preferred embodiments of direct heat-to-electrical power converter 266 comprise thermophotovoltaic electrical power generator 270 adapted to use the thermal radiation from combustion heat energy 132 to generate electrical power 140. Preferably, working fluid heat exchanger 136 (at least embodying herein at least one primary heat exchanger structured and arranged to transfer such combustion heat to such at least one heat energy converter) comprises a plurality of self-contained thermophotovoltaic (TPV) vessels encapsulating photocells responsive at infrared wavelengths. These heat responsive photocells generate electrical power 140, as shown. Thermophotovoltaic electrical power generators 270 have been successfully used in regenerative sideport glass tank melting furnaces in industrial glass production, and are readily adaptable to function within direct heat-to-electrical power converter 266. It is noted that the configuration and operation of such thermophotovoltaic electrical power generator devices are described in greater detail in, for example, U.S. Pat. No. 6,538,193 to Fraas, incorporated herein by reference for further examples of implementation engineering.

Figure 2C:
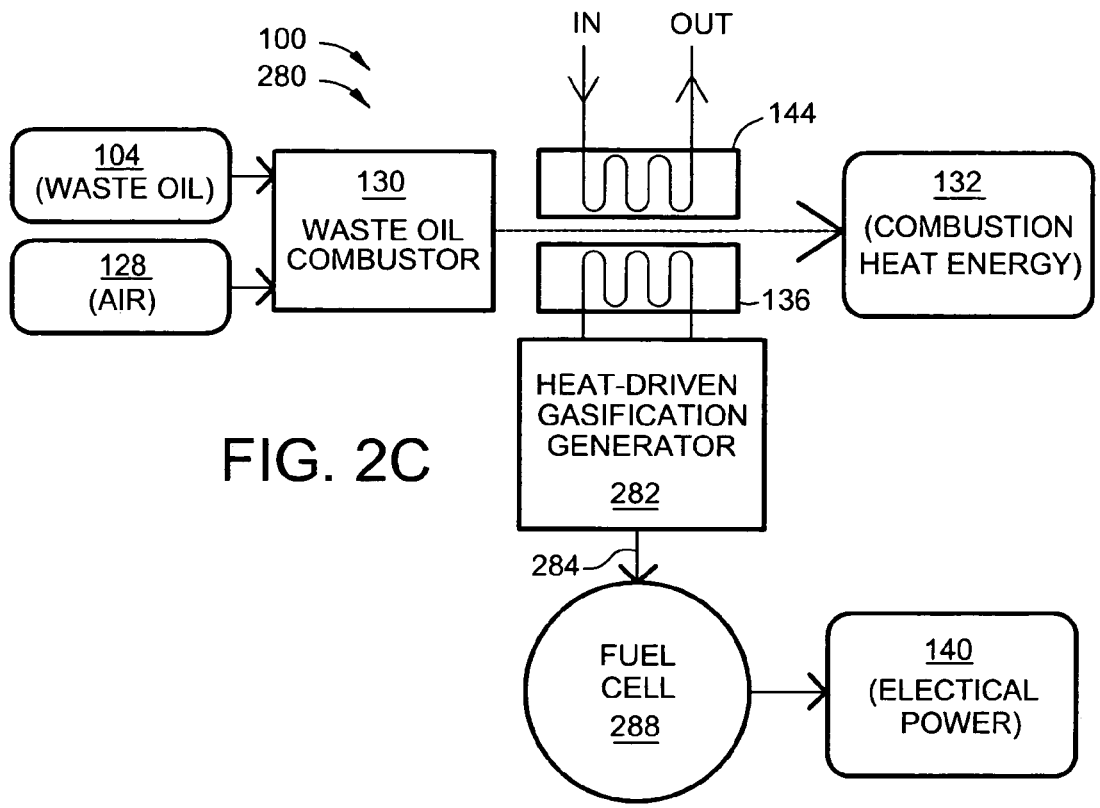
FIG. 2C is a diagrammatic illustration of the principal components of a waste oil cogeneration system based on a heat-driven gasification generator coupled to a electrical power generating fuel cell according to a preferred embodiment of the present invention.

FIG. 2C is a diagrammatic illustration of the principal components of waste oil co-generator 280 (at least embodying herein at least one heat energy converter structured and arranged to convert such combustion heat to electrical power) of waste oil cogeneration system 100 based on heat-driven gasification generator 282 coupled to an electrical power generating fuel cell 288 according to a preferred embodiment of the present invention. Preferably, waste oil co-generator 280 is adapted to gasify an input of waste oil 104 utilizing combustion heat energy 132 conducted to heat-driven gasification generator 282 by working fluid heat exchanger 136 (at least embodying herein at least one primary heat exchanger structured and arranged to transfer such combustion heat to such at least one heat energy converter), as shown. Preferably, heat-driven gasification generator 282 operates within a preferred "low-temperature" range of between about 700 and 1800 degrees Fahrenheit. Preferably, such gasification of waste oil 104 results in the production of raw gas products that are introduced into a fuel reforming process adapted to produce fuel gas 284 that is generated by decomposition of high-molecular hydrocarbons contained within the raw gas products. Preferred fuel reforming processes include the reaction of the raw gas products with Ni—Mo-base or Co—Mo-base catalysts to accelerate reduction in molecular weight of hydrocarbons. In addition, preferred fuel reforming processes include in injection of hydrogen and oxygen (in the form of steam) to further facilitate the reaction process.

Preferably, fuel gas 284, substantially comprising a mixture of hydrogen and carbon dioxide, is supplied to fuel cell 288, as shown. Most preferably, working fluid heat exchanger 136, the fuel reforming process, and fuel cell 288 are integrated to simplify the configuration of the overall apparatus and to improve efficiency. This preferred arrangement enables heat produced by waste oil combustor 130 and fuel cell 288 to be effectively used in the fuel reforming process. It is noted that the configuration and operation of such heat-driven gasification generators coupled to electrical power generating fuel cells are described in greater detail in, for example, European Patent Application No. EP 1 136 542 to Fujimura et al., incorporated herein by reference for further examples of implementation engineering.

Upon reading the teachings of FIG. 2A through FIG. 2C, those of ordinary skill in the art will now understand that, waste oil cogeneration system 100 is adaptable to comprise a functional range of closely related preferred embodiment, specifically preferred embodiments utilizing the combustion of hazardous waste to produce electrical power. Based on factors that include present economics, commercial availability of essential system components, current state of existing technology, etc., it is most preferred that waste oil cogeneration system 100 be based on the mechanical heat-to-power embodiment of FIG. 2A. More specifically, it is currently most preferred that waste oil cogeneration system 100 comprise a Stirling-cycle device to convert the combustion heat energy 132 to mechanical energy 133 used to drive electrical generator 138. The remainder of the present disclosure is focused on enabling embodiments of the present invention incorporating Stirling-cycle devices as the prime mover driving electrical generator 138.

Stirling-cycle engines were originally patented in 1816 and were commonly used prior to World War I. Stirling-cycle technology quickly became a popular alternative to steam engines due, in part, to a better operational safety record (early Stirling engines commonly used air as the working fluid). As steam engine technology improved, the Stirling engine eventually lost favor. Recent interest in distributed energy generation has revived interest in Stirling engines and, as a result, research and development efforts have increased.

The theoretical and practical design of the Stirling-cycle engine is known in the art, and therefore, will not be discussed at length within this disclosure. It is noted that the design and operation of such Stirling-cycle devices is described in greater detail in, for example, the dissertation entitled, "*Stirling Cycle Engine Analysis*", by Dr. Israel Urieli of Ohio University (1884), incorporated herein by reference as prior art enabling, in conjunction with this specification, the below described Stirling-cycle engines Stirling engines are classed as external combustion engines, comprising a sealed system utilizing an inert internal working fluid (typically a gas, such as helium), in conjunction with an external heat source and heat exchanger. Stirling-cycle engines take advantage of the relationship between heat, volume, and pressure of a gas to produce mechanical power.

Figure 3A:
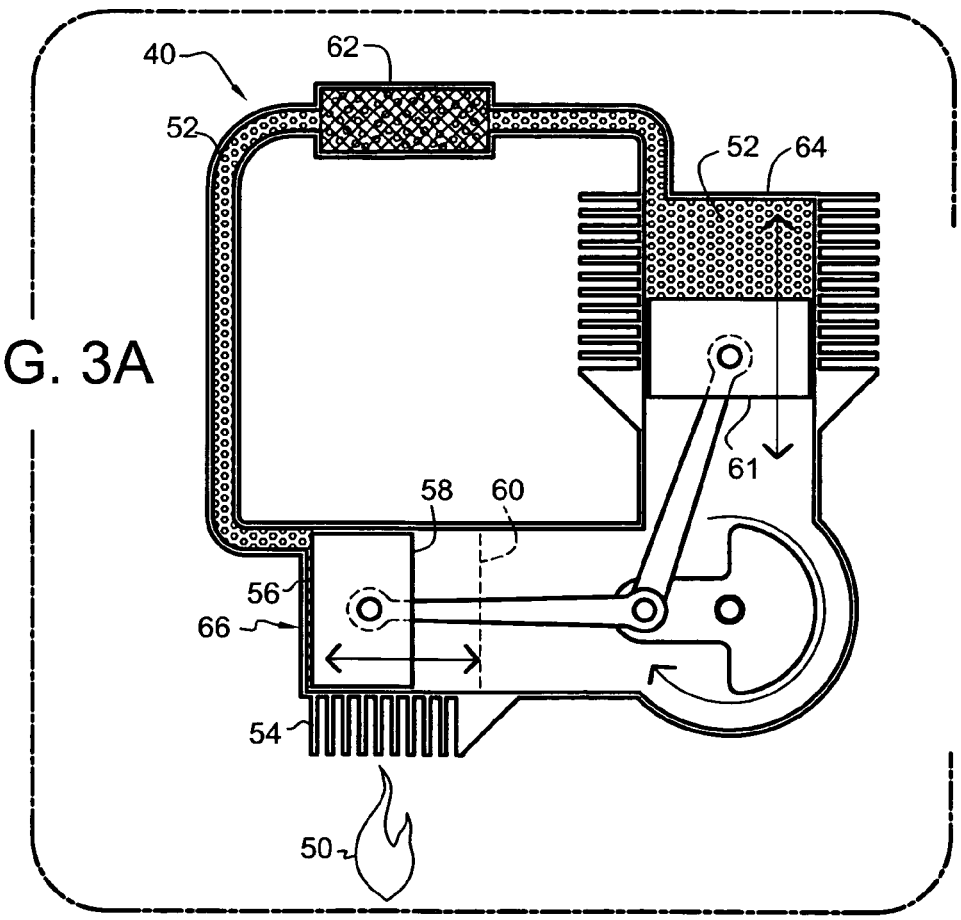
FIG. 3A is a diagrammatic sectional view, illustrating in general, the operational principles of a typical Stirling-cycle system.

Referring now to FIG. 3A, in typical Stirling-cycle engine 40, heat 50 is transferred to working gas 52 through heat exchanger 54. Pressure of working gas 52 rises with the increased gas temperature as working gas 52 is held within the fixed volume of sealed cylinder 56. This increase in the pressure of working gas 52 pushes piston 58 to perform mechanical work. As piston 58 reaches a position of maximum cylinder volume 60, mechanical displacement mechanism 61 moves working gas 52 from the above-described "hot" portion of the engine 66 through "regenerator" 62 to a "cool" portion of the engine 64. In moving through regenerator 62, heat from working gas 52 is temporarily stored. Mechanical displacement mechanism 61 continues to move the cooled working gas 52 through the cycle in such a way as to move and compress cooled working gas 52 back to hot portion of the engine 66 through regenerator 62 (where it picks up the heat left behind within the regenerator matrix). Working gas 52 is further heated in heat exchanger 54 and the cycle begins again. Currently, no Stirling-cycle engine operates on the combustion heat produced by the burning of hazardous waste oil or through the utilization of hazardous waste oil produced through one or more on-site processes.

It is clear from the above discussions that an effective, efficient combination of a Stirling-cycle engine and waste oil burner would be of great economic and environmental benefit. With such combination, a significant portion of the "waste heat" lost in existing waste oil burner designs can be effectively recovered by a Stirling-cycle engine, thereby greatly increasing the overall energy efficiency of the combined system.

It has been determined that waste oil possesses nearly twice the energy value of coal, and more energy than #2 fuel oil. It should be noted that the term "environmentally hazardous waste oils", as used within this specification and the below claims, shall include within the definition those oils classified by the governing agencies as "recyclable" for energy recovery through burning. The applicant has estimated that using such combined used-oil-fired Stirling-cycle engine, one gallon of used oil can generate up to 18-kilowatt hours of electricity.

Operators of an on-site waste-oil-fired electrical generation system may find further economic benefits by selling surplus power back to an electrical utility, via an avoided rate, or net metering program. Additionally, off-grid operators of an on-site waste-oil-fired electrical generation system will benefit from a convenient, packaged source of electrical power, space heat and hot water.

Thus it is therefore a further object and feature of the present invention to provide such a system that converts the combustion energy of waste oil into mechanical energy by use of a Stirling-cycle engine. Thus, it is an additional object and feature of the present invention to provide such a system that utilizes the mechanical output of the Stirling-cycle engine to drive an electrical generator.

Figure 3B:
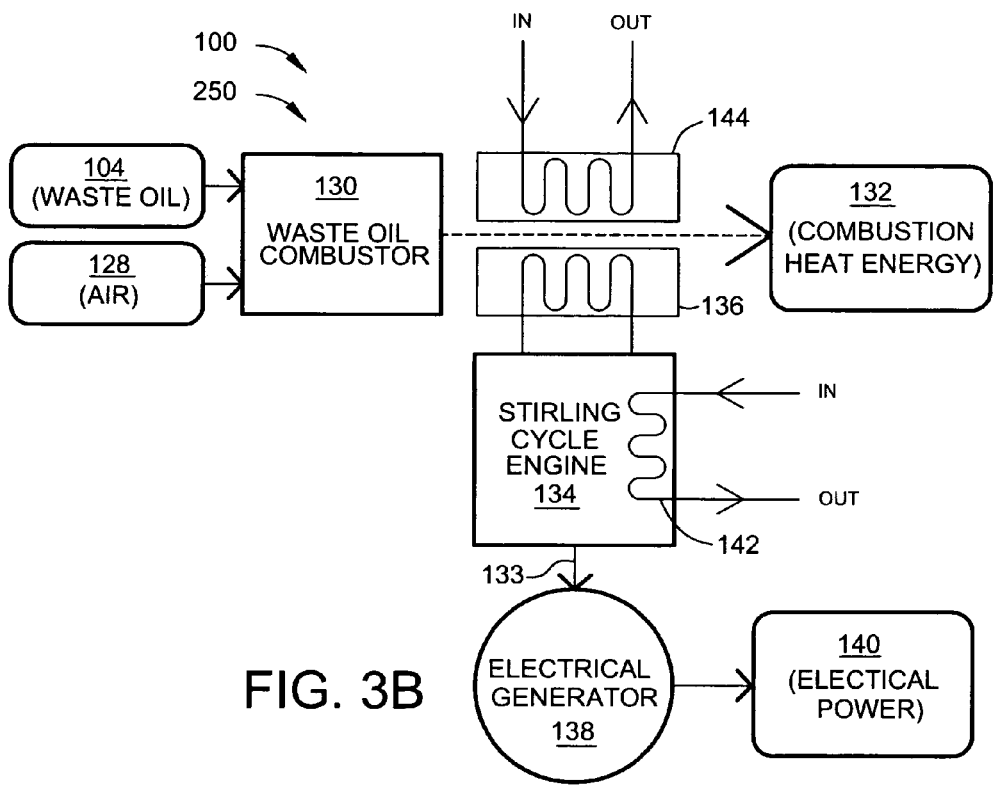
FIG. 3B is a diagrammatic illustration of the principal components of a waste oil cogeneration system based on a heat-to-mechanical power converter comprising a Stirling engine, according to the preferred embodiment of FIG. 2A.

FIG. 3B is a diagrammatic illustration of the principal components of waste oil co-generator 250 of waste oil cogeneration system 100, according to the preferred embodiment of FIG. 2A. Preferably, waste oil co-generator 250 contains at least one waste oil combustor 130 (at least embodying herein at least one combustion heater structured and arranged to produce combustion heat by burning such on-site-generated environmentally hazardous waste oils) that combines waste oil 104 with compressed air 128 to form a highly combustible atomized air/fuel mixture. Igniting the atomized mixture of waste oil 104 and compressed air 128 generates combustion heat energy 132, as shown.

A primary function of waste oil electrical cogeneration system 100 is the conversion of combustion heat energy 132 into electrical power 140, as shown. The conversion of combustion heat energy 132 into electrical power is accomplished through a basic multi-step process. Preferably, working fluid heat exchanger 136 (at least embodying herein at least one primary heat exchanger structured and arranged to transfer such combustion heat to such at least one heat energy converter) is brought into thermal relationship with combustion heat energy 132 (at least embodying herein at least one primary heat exchanger structured and arranged to transfer such combustion heat to such at least one heat energy converter), initiating the transfer of heat from combustion heat energy 132 to Stirling-cycle engine 134, as shown. Preferably, Stirling-cycle engine 134 is arranged to convert the heat transferred by working fluid heat exchanger 136 into mechanical energy 133 (e.g., torque within a rotating output shaft), as shown (at least embodying herein at least one heat-to-mechanical power converter adapted to convert such combustion heat to mechanical power and wherein such at least one heat-to-mechanical power converter comprises at least one Stirling-cycle engine structured and arranged to use the mechanical output of at least one Stirling cycle to produce mechanical power). Preferably, Stirling-cycle engine 134 is operationally coupled to electrical generator 138 (at least embodying herein at least one electrical generator adapted to generate electrical power) that converts mechanical energy 133 into electrical power 140.

As previously described, waste oil electrical cogeneration system 100 is preferably a cogeneration (or multi-generation) unit wherein secondary energy, in the form of usable heat, is derived from the system. In the example of FIG. 3B, secondary fluid heat exchanger 144 (at least embodying herein at least one secondary heat exchanger structured and arranged to transfer at least one portion of the combustion heat to at least one heatable fluid) is brought into thermal relationship with combustion heat energy 132, drawing usable heat from combustion heat energy 132, as shown.

Figure 4:
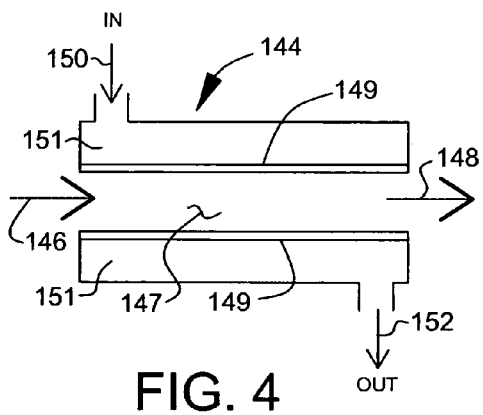
FIG. 4 is a diagrammatic illustration of the secondary fluid heat exchanger according to the preferred embodiment of FIG. 2A through FIG. 3B.

FIG. 4 is a diagrammatic illustration of secondary fluid heat exchanger 144, according to the preferred embodiments of FIG. 2A through 3B. In the highly simplified model of FIG. 4, secondary fluid heat exchanger 144 comprises two approximately concentric pipes, each pipe having an input and output. Preferably, incoming combustion heat 146 is introduced into and moves through combustion chamber 147 before exiting as outgoing combustion heat 148, as shown. Similarly, a lower temperature incoming secondary fluid 150 is introduced into secondary fluid channel 151, where it moves around combustion chamber 147 before exiting as outgoing secondary fluid 152, as shown. As incoming secondary fluid passes around combustion chamber 147, heat energy is transferred from incoming combustion heat 146 to the lower temperature incoming secondary fluid 150, across secondary heat exchanger wall 149, thereby raising the temperature of incoming secondary fluid 150. In practical application, the efficiency of heat-energy transfer across secondary heat exchanger wall 149 can never achieve one hundred percent. Due to factors such as transfer surface area and material heat-transfer rates, a significant percentage of the heat energy of incoming combustion heat 146 will remain in outgoing combustion heat 148, discharged from the system as waste exhaust. Oil combustion burner systems for space heating may discharge as much as seventy percent of outgoing combustion heat 148 as waste exhaust.

Figure 5:
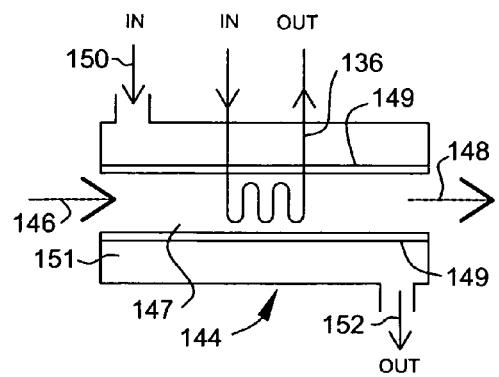
FIG. 5 is a diagrammatic illustration of the secondary fluid heat exchanger showing the working fluid heat exchanger introduced into the combustion chamber according to the preferred embodiments of FIG. 2A through FIG. 3B.

FIG. 5 is a diagrammatic illustration of secondary fluid heat exchanger 144, showing working fluid heat exchanger 136 introduced into combustion chamber 147, according to the preferred embodiments of FIG. 2A through 3B. By placing working fluid heat exchanger 136 into combustion chamber 147, waste oil electrical cogeneration system 100 effectively captures and utilizes heat energy of outgoing combustion heat 148 that is normally lost as waste exhaust, as shown. It should be noted that the introduction of working fluid heat exchanger 136 into combustion chamber 147 has minimal impact on the quantity or rate of heat energy transfer from incoming combustion heat 146 to incoming secondary fluid 150 across secondary heat exchanger wall 149.

Figure 6:
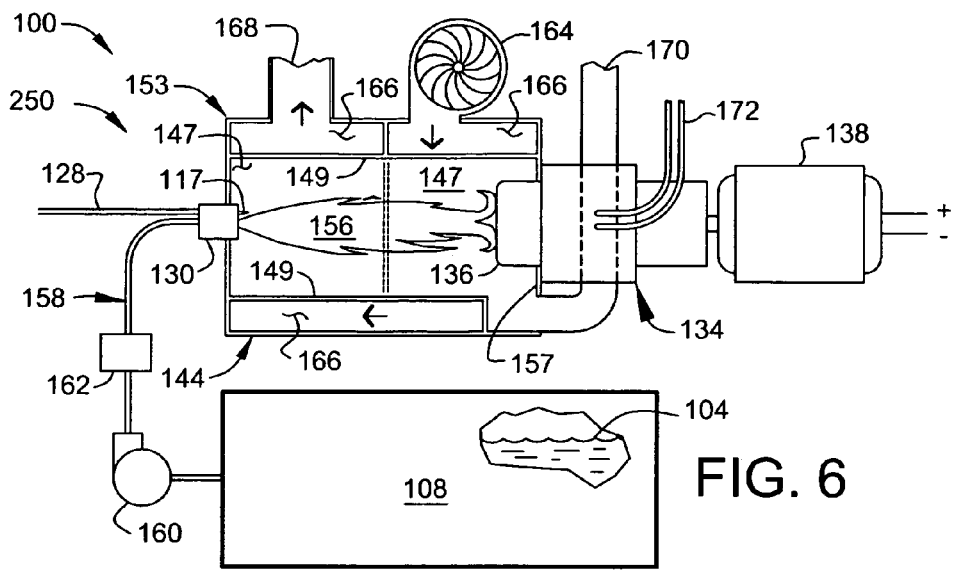
FIG. 6 is a diagrammatic configuration view of a waste oil cogeneration system according to a preferred embodiment of the present invention.

FIG. 6 is a diagrammatic sectional view of waste oil co-generator 250 of waste oil cogeneration system 100, according to a preferred embodiment of the present invention. Preferably, waste oil co-generator 250 is an assembly comprised of waste-oil-fired hot air furnace 153, modified to receive Stirling-cycle engine 134 and electrical generator 138, as shown. Preferably, waste-oil-fired hot air furnace 153 is a commercially available unit, for example, waste-oil-fired hot air furnaces produced by Clean Burn, Inc. of Leola, Pa., U.S.A. Waste oil burning devices of this type are also known by those skilled in the art as "multi-oil furnaces", and typically include a number of specific features to allow for efficient combustion of multiple waste oil types having varying physical properties.

In a typical arrangement, waste oil 104 is preferably held in waste oil collection tank 108 of waste oil electrical cogeneration system 100 prior to being transferred to waste oil combustor 130, via waste oil transfer assembly 158 (at least embodying herein at least one waste oil transfer component structured and arranged to transfer such on-site-generated environmentally hazardous waste oils from such at least one holder to such at least one combustion heater), as shown. Preferably, waste oil transfer assembly 158 includes waste oil pump 160 (at least embodying herein at least one pump structured and arranged to pump such on-site-generated environmentally hazardous waste oils from such at least one holder to such at least one combustion heater), as shown.

Typically, waste oil 104 is pre-conditioned before reaching waste oil combustor 130 by passing through waste oil volume/viscosity control 162, as shown. Pre-conditioning provided by waste oil volume/viscosity control 162 typically includes such actions as flow rate sampling, control of waste oil transfer rate and pre-heating of waste oil 104 to assist in managing oil viscosity for optimal combustion conditions within combustion chamber 147, as shown (at least embodying herein at least one flow volume regulator structured and arranged to regulate the flow volume of such on-site-generated environmentally hazardous waste oils pumped from such at least one holder to such at least one combustion heater; and at least one pre-heater structured and arranged to preheat such on-site-generated environmentally hazardous waste oils prior to burning). It is noted that the configuration and operation of such waste oil pre-conditioning devices is described in greater detail in, for example, U.S. Pat. No. 5,551,868 to Smoker et al., incorporated herein by reference for further examples of implementation engineering.

Preferably, waste oil combustor 130 is a highly efficient design, comprising at least one burner nozzle that combines a flow of compressed air 128 with a flow of pre-heated waste oil 104 (at least embodying herein at least one atomizer structured and arranged to atomize such on-site-generated environmentally hazardous waste oils prior to combustion). Preferably, the mixture of compressed air 128 and waste oil 104 is injected into combustion chamber 147, where ignition assembly 117 (at least embodying herein at least one igniter structured and arranged to ignite such on-site-generated environmentally hazardous waste oils after such on-site-generated environmentally hazardous waste oils have passed through such at least one atomizer) ignites the atomized mixture generating a focused combustion flame 156 directed to the interior of combustion chamber 147 (see also FIG. 10). It is noted that the configuration and operation of waste oil combustors (such as waste oil combustor 130) is described in greater detail in, for example, U.S. Pat. No. 6,048,197 to Beiler, incorporated herein by reference for further examples of implementation engineering. Commercially-available waste oil combustors of the type preferably used in the present invention may be supplied with an approximate thermal output ranging from about 100,000 BTUs/hr to over 500,000 BTUs/hr at temperatures of up to about 2,000 degrees Fahrenheit (at least embodying herein wherein such at least one combustion heater has a maximum capacity of not more than 0.5 million BTU input per hour).

Preferably, secondary fluid heat exchanger 144 of waste-oil-fired hot air furnace 153 comprises at least one combustion chamber 147 surrounded on all sides by heat exchanger air channel 166, as shown. Preferably, air intake fan 164 moves the secondary fluid (comprising air in the present embodiment) through heat exchanger air channel 166, where it is heated before passing out of heat exchanger air channel 166 by means of hot air discharge 168, as shown. The heated air exiting hot air discharge 168 is preferably used to provide local space heating (at least embodying herein wherein such at least one secondary heat exchanger is structured and arranged to transfer heat to air usable for space heating) within the waste oil electrical cogeneration system site (as previously described in FIG. 1). Preferably, combustion chamber 147 includes combustion gas discharge flue 170 to remove spent combustion gases from the system, as shown (at least embodying herein wherein combustion gasses produced by the combustion of such on-site-generated environmentally hazardous waste oils is vented to the outside air). It is noted that the configuration and operation of such a secondary fluid heat exchanger is described in greater detail in, for example, U.S. Pat. No. 5,531,212 to Smoker et al., incorporated herein by reference for further examples of implementation engineering.

It is currently preferred that within waste-oil-fired hot air furnace 153, working fluid heat exchanger 136 is introduced into combustion chamber 147 through back wall 157 (as apposed to Smoker et al., for example), thereby permitting a portion of the heat energy from the directed combustion flame 156 (at least embodying herein at least one directed heat flow) to be transferred to Stirling-cycle engine 134, as shown. Preferably, the configuration of working fluid heat exchanger 136 is such that combustion flame 156 is directed back in combustion chamber 147, thereby maintaining the overall efficiency of the combustion and secondary heat transfer process, as shown (at least embodying herein wherein such combustion heat produced by such at least one combustion heater comprises at least one directed heat flow; at least one portion of such at least one primary heat exchanger is positioned to be in thermal communication with such at least one directed heat flow; and such at least one primary heat exchanger is structured and arranged to direct at least one portion of such at least one directed heat flow to such at least one secondary heat exchanger). Upon reading this specification, those with ordinary skill in the art will understand that, under appropriate circumstances, such as, to accommodate specific furnace thermal performance characteristics, user preference, advances in technology, etc., other positions of the working fluid heat exchanger within the combustion chamber, such as, for example, non-concentric, front mounted, etc., may suffice.

Preferably, Stirling-cycle engine 134 comprises a 480 cc four-piston alpha configuration, such as Model STM 4-120 produced by Stirling Thermal Motors, Inc. of Ann Arbor, Mich., U.S.A. Using a waste oil burner having a combustion flame temperature of approximately 1,400 degrees Fahrenheit (as measured at working fluid heat exchanger 136), Stirling-cycle engine 134 typically produces about 40 hp at an average shaft speed of about 1800 rpm. Preferably, Stirling-cycle engine 134 is coupled to an "off-the-shelf" induction-type electrical generator 138, preferably having a rated electrical output (after inverter processing) of 25 kW at 480 VAC/3-phase at 60 Hz. Further, Stirling-cycle engine 134 typically produces up to 150,000 BTUs/Hr of hot water from the engine's internal coolant circuit, delivered by means of Stirling engine coolant lines 172, as shown.

Figure 7:
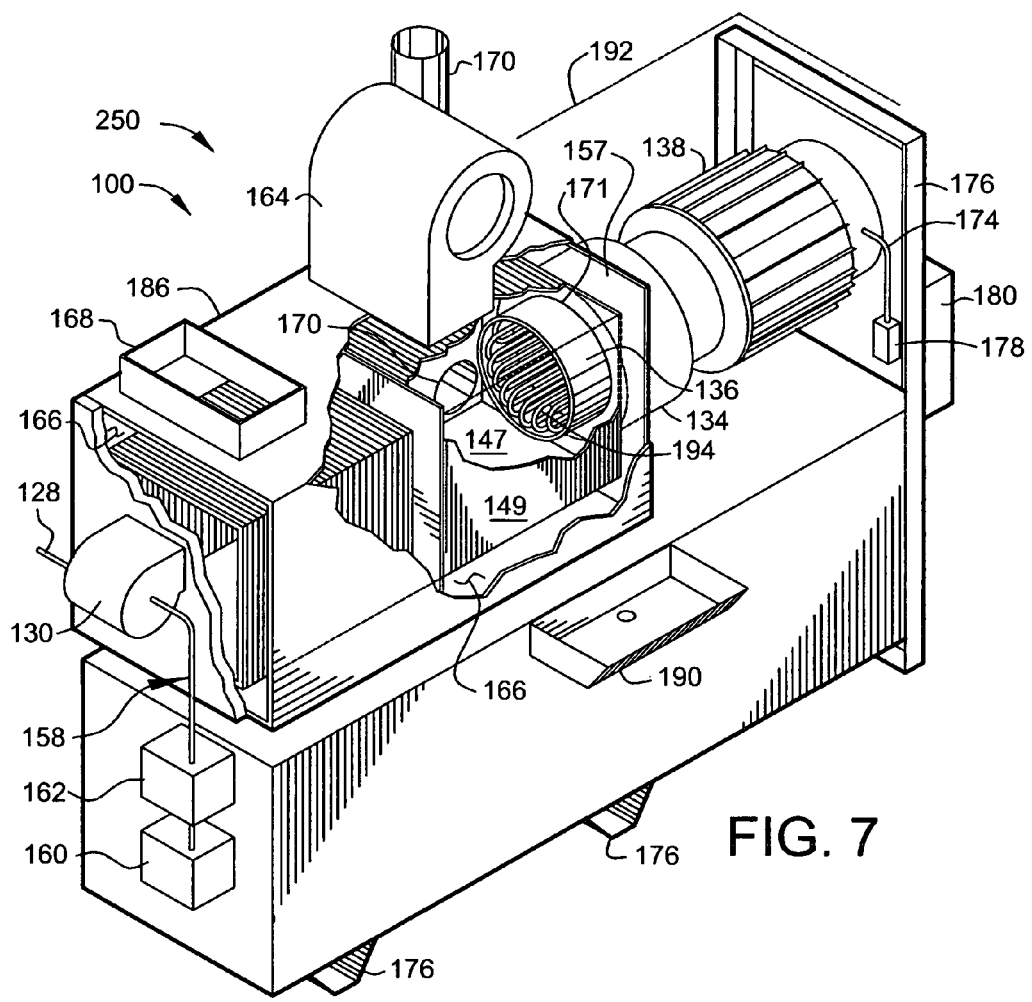
FIG. 7 is a perspective view, in partial section, of the waste oil cogeneration system of the preferred embodiment of FIG. 6.

FIG. 7 is a perspective view, in partial section, of the waste oil cogeneration system 100, according to the preferred embodiment of FIG. 6. The cut-away view of FIG. 7 more clearly shows the preferred arrangement of working fluid heat exchanger 136 within combustion chamber 147. Modifications to Stirling-cycle engine 134 required to permit the engine to be incorporated into waste oil cogeneration system 100 are clearly within the abilities of those skilled in the art in light of the present teachings, preferably limited to removal of the factory burner assembly.

Preferably, back wall 157 of combustion chamber 147 is prepared to receive Stirling-cycle engine 134, by cutting heat exchange aperture 171 through back wall 157, and by further locating and drilling appropriately-sized mounting holes matching the standard mounting holes of the Stirling-cycle engine factory burner assembly. Upon reading this specification, those with ordinary skill in the art will understand that, under appropriate circumstances, such as heavy duty applications, specific furnace/engine combinations, etc., other assemblies, such as, for example, additional plate adapters and/or reinforcing added to back wall 157 to further anchor and support Stirling-cycle engine 134, may suffice.

Preferably, working fluid transfer lines 194 of working fluid heat exchanger 136 are oriented to be in direct contact with the focus of combustion flame 156, as shown. Upon reading this specification, those with ordinary skill in the art will understand that, under appropriate circumstances, such as to enhance the performance of the heat transfer processes within the waste oil cogeneration system, the use of other heat-retaining, heat-blocking and heat-directing elements, such as, for example, ceramic shapes, heat-resistant deflectors, etc., may be used at various positions within the combustion chamber. For example, a metallic or ceramic heat-directing ring placed around working fluid heat exchanger 136 to control the return path of combustion flame 156, may suffice.

Preferably, the overall configuration of waste oil cogeneration system 100 comprises a self-contained unit having an internal system support structure 176, preferably constructed from metal, preferably steel, as shown. Preferably, all external access panels 192 are removable for servicing and inspection, as shown. Preferably, collection tank 108 includes one or more waste oil collection assemblies 190 to assist in the collection and storage of waste oil 104, as shown (at least embodying herein wherein such at least one holder comprises at least one collector structured and arranged to assist in collecting such on-site-generated environmentally hazardous waste oils). Upon reading this specification, those with ordinary skill in the art will understand that, under appropriate circumstances, such as to address issues of user preference, advances in technology, etc., other locations for the waste oil collection point, such as, for example, exterior collection assemblies, remote collection areas, etc., may suffice.

Electrical power assemblies 178 preferably route power from electrical generator 138 to electrical power controls 180 mounted on or near waste oil cogeneration system 100, as shown. Preferably, electrical power controls 180 include such devices as: safety breakers, power disconnects, power monitors and controllers, charge controllers for a battery storage system (at embodying herein wherein such at least one electrical controller is structured and arranged to control at least one transfer of electrical power between such at least one electrical storage device and such at least one electrical network) and power inverters, including trace PS and SW series inverters for utility grid connection capability (at least embodying herein at least one electrical controller structured and arranged to control electrical power within such at least one electrical network, and wherein such at least one electrical controller is structured and arranged to control electrical power flowing between such at least one electrical network and the at least one larger electrical grid), thereby permitting the sale of surplus-generated power back to the utility through net metering or similar programs (embodying herein using surplus usable heat energy from combusting such on-site-generated environmentally hazardous waste oils for on-site heating uses). Further, those of ordinary skill in the art will, upon reading this specification understand that, under appropriate circumstances, electrical power controls 180 may include internal power metering to allow, for example, the manufacturer of waste oil cogeneration system 100 to place units within a waste oil cogeneration site on a cost partnership basis (where all or a pre-arranged portion of the electrical power generated by waste oil cogeneration system 100 is sold by the manufacturer to the co-generating site, at a grid competitive or pre-arranged rate). The above-described preferred arrangement herein embodies: collecting on-site-generated environmentally hazardous waste oils; combusting such on-site-generated environmentally hazardous waste oils to produce usable heat energy; using such usable heat energy to power at least one Stirling-cycle engine; using the output from such Stirling-cycle engine to generate useful electrical power; and selling at least one portion of such useful electrical power by way of at least one electrical grid connection.

Preferably, waste oil cogeneration system 100 is scalable to larger generation applications by using the combined generating power of multiple waste oil cogeneration system(s) 100.

Figure 8:
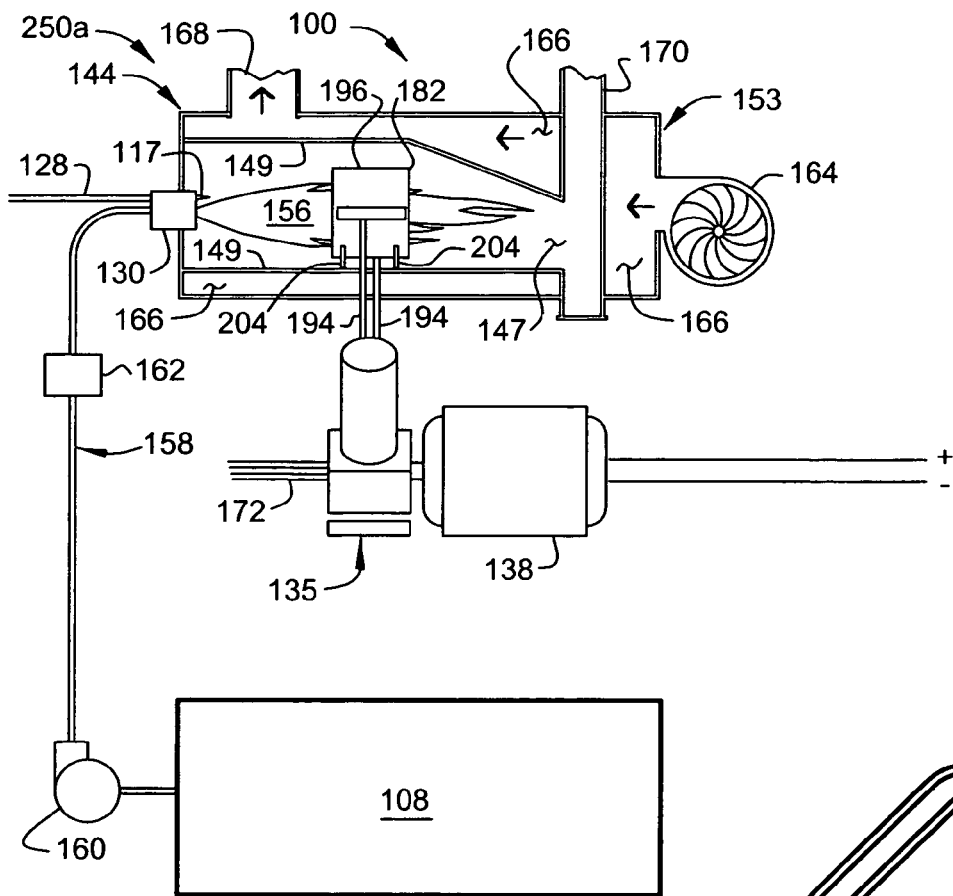
FIG. 8 is a diagrammatic sectional view of an alternate preferred waste oil cogeneration system according to an alternate preferred embodiment of the present invention.

FIG. 8 is a diagrammatic sectional view of an alternate preferred waste oil co-generator 250a of waste oil cogeneration system 100, according to another highly preferred embodiment of the present invention. Preferably, waste oil co-generator 250a is an assembly comprised of waste-oil-fired hot air furnace 153 modified to receive toroidal-shaped heat exchanger 196 of Stirling-cycle engine 135, as shown. Preferably, waste-oil-fired hot air furnace 153 is a commercially available unit produced by Black Gold Corporation of Nashville, Tenn., U.S.A.

Preferably, waste oil 104 is held in waste oil collection tank 108 (of waste oil co-generator 250a) prior to being transferred to waste oil combustor 130, via waste oil transfer assembly 158, as shown. Preferably waste oil transfer assembly 158 includes waste oil pump 160 (at least embodying herein at least one pump to pump such on-site-generated environmentally hazardous waste oils from such at least one holder to such at least one combustion heater), as shown.

Depending on such factors as temperature and the type of waste oil being burned, waste oil 104 may be pre-conditioned before reaching waste oil combustor 130 by passing through waste oil volume/viscosity control 162, as shown. Pre-conditioning provided by waste oil volume/viscosity control 162 may include such actions as flow rate sampling, control of waste oil transfer rate and pre-heating of waste oil 104 to assist in managing oil viscosity for optimal combustion conditions within combustion chamber 147, as shown. Preferably, waste oil combustor 130 comprises a burner nozzle that combines a flow of compressed air 128 with a flow of pre-heated waste oil 104. Preferably, the mixture of compressed air 128 and waste oil 104 is injected into combustion chamber 147, where an ignition assembly 117 ignites the atomized mixture generating combustion flame 156, as shown. It is noted that the configuration and operation of such waste oil pre-conditioning devices is described in greater detail in, for example, U.S. Pat. No. 5,879,149 to Briggs et al., incorporated herein by reference for further examples of implementation engineering.

Preferably, secondary fluid heat exchanger 144 of waste-oil-fired hot air furnace 153 comprises combustion chamber 147, surrounded on all sides by heat exchanger air channel 166, as shown. Preferably, air intake fan 164 moves the secondary fluid (in this case air) through heat exchanger air channel 166, where it is heated, before passing out of heat exchanger air channel 166 through hot air discharge 168, as shown. The heated air exiting hot air discharge 168 is again preferably used to provide local space heating within the waste oil electrical cogeneration system site (as previously described in FIG. 1). Preferably, combustion chamber 147 includes combustion gas discharge flue 170 to remove spent combustion gases from the system, as shown. It is noted that the configuration and operation of such a secondary fluid heat exchanger is described in greater detail in, for example, U.S. Pat. No. 4,955,359 to Briggs et al. and U.S. Pat. No. 5,363,836 to Briggs, incorporated herein by reference for further examples of implementation engineering.

Toroidal-shaped heat exchanger 196 is preferably coaxially positioned within the interior of combustion chamber 147, preferably along the chamber's longitudinal axis, preferably at a position equidistant from waste oil combustor 130 and combustion gas discharge flue 170, as shown. Toroidal-shaped heat exchanger 196 may be firmly positioned within combustion chamber 147 by a plurality of support members 204 anchored to secondary heat exchanger wall 149, as shown. Preferably, combustion flame 156 is directed to pass through the interior of toroidal-shaped heat exchanger 196, as shown. In the preferred embodiment of FIG. 8, working fluid transfer lines 194 provide the fluid transfer path between toroidal-shaped heat exchanger 196, and Stirling-cycle engine 135, as shown. The above-described embodiment allows Stirling-cycle engine 135 to be located outside waste-oil-fired hot air furnace 153 in a preferred arrangement, as shown. Upon reading this specification, those with ordinary skill in the art will understand that, under appropriate circumstances, such as, user preference, advances in technology, particular space/cost/use circumstances, etc., other selection of internal/external arrangements, may suffice.

As one preferred example, Stirling-cycle engine 135 comprises a 160 cc 90° V-2-cylinder unit, preferably Model V-160 produced by Solo Kleinmoteren GmbH of Sindelfingen, Germany. Using a waste oil burner having a combustion flame temperature of approximately 1,300 degrees Fahrenheit (700° C.) (as measured at working fluid heat exchanger 136), Stirling-cycle engine 135 produces about 11 kW of mechanical power at an average shaft speed of about 1500 rpm (with working fluid heat exchanger 136 maintaining an average working gas pressure of 15 Mpa). Preferably, Stirling-cycle engine 135 is coupled to an induction-type electrical generator 138, having a rated electrical output (after inverter processing) of 25 kW at 480 VAC/3-phase at 60 Hz. Further, Stirling-cycle engine 135 produces up to 150,000 BTUs/Hr of hot water from the engine's internal coolant circuit delivered through Stirling engine coolant lines 172, as shown.

Figure 8A:
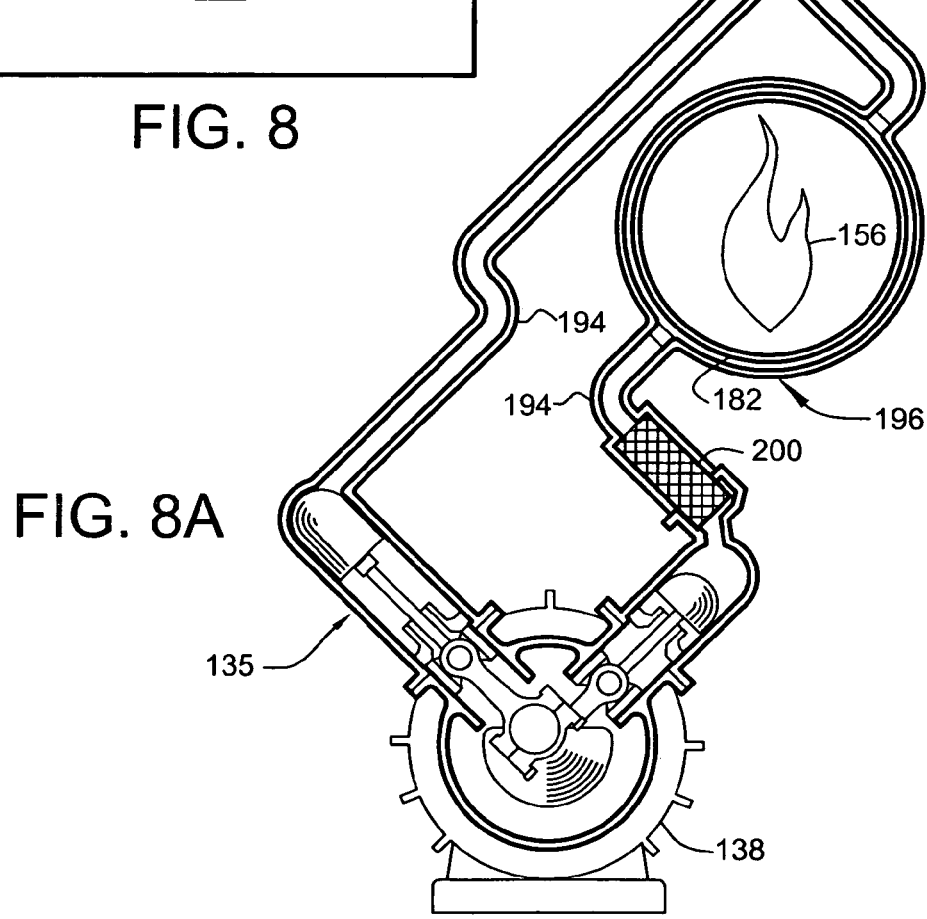
FIG. 8A is a diagrammatic illustration, partially in section, of the torodial-shaped working fluid heat exchanger, Stirling-cycle engine, and electrical generator of the alternate preferred embodiment of FIG. 8.

FIG. 8A is a diagrammatic illustration, partially in section, of the torodial-shaped working fluid heat exchanger 196, Stirling-cycle engine 135, and electrical generator 138 of the alternate preferred embodiment of FIG. 8.

Preferably, toroidal-shaped working fluid heat exchanger 196 is formed from a tightly-coiled arrangement of heat exchange tubes 182, as shown. Preferably, heat exchange tubes 182 and working fluid transfer lines 194 each comprise ¼" diameter tubing, preferably constructed from stainless steel or heat-resistant inconel 713/625. Upon reading this specification, those with ordinary skill in the art will understand that, under appropriate circumstances, in consideration of such issues as material cost, user preference, advances in technology, etc., other working fluid transfer line configurations, such as, for example, alternate tubing diameters, heat-resistant materials, etc., may suffice.

Figure 9:
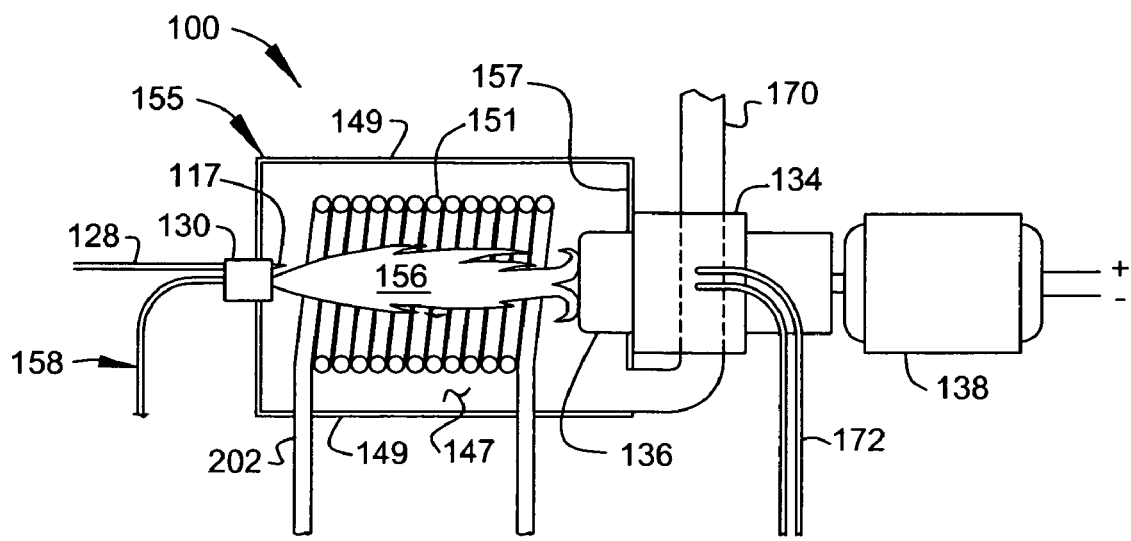
FIG. 9 is a diagrammatic sectional view of a waste oil cogeneration system according to yet another preferred embodiment of the present invention.

FIG. 9 is a diagrammatic sectional view of waste oil cogeneration system 100, according to another preferred embodiment of the present invention. Preferably, waste oil electrical cogeneration system 100 comprises a waste-oil-fired hot water boiler 155 modified to receive Stirling-cycle engine 134, as shown. As one preferred example, waste-oil-fired hot water boiler 155 may comprise a commercially available unit produced by Clean Burn, Inc. of Leola, Pa., U.S.A.

In operation, waste oil 104 is preferably transferred to waste oil combustor 130, via waste oil transfer line 158, as shown. As in the prior embodiments of FIG. 6 and FIG. 8, waste oil combustor 130 is preferably a high-efficiency design comprising at least one burner nozzle that combines a flow of compressed air 128 with a flow of pre-heated waste oil 104 that, when ignited within combustion chamber 147, generates focused combustion flame 156, as shown. It is noted that the configuration and operation of waste oil combustors, such as waste oil combustor 130, is described in greater detail in, for example, U.S. Pat. No. 6,048,197 to Beiler, incorporated herein by reference for further examples of implementation engineering (see FIG. 10). Commercially available waste oil combustors of the type preferably used in the present invention may be supplied with an approximate thermal output ranging from about 100,000 BTUs/hr more than 500,000 BTUs/hr at temperatures of up to about 2,000 degrees Fahrenheit, well within the operating requirements of Stirling-cycle engine 134.

Preferably, waste-oil-fired coil tube boiler 155 comprises at least one combustion chamber 147 containing coiled tube heat exchanger 202, as shown. Preferably, water pumped through coiled tube heat exchanger 202 is heated by combustion flame 156, as shown. The hot water exiting coiled tube heat exchanger 202 is preferably used to provide local domestic hot water or space heating within the waste oil electrical cogeneration system site. Preferably, combustion chamber 147 includes combustion gas discharge flue 170 to remove spent combustion gases from the system, as shown. It is noted that the configuration and operation of such a waste-oil-fired coil tube boiler is described in greater detail in, for example, U.S. Pat. No. 6,085,701 to Stauffer et al., incorporated herein by reference for further examples of implementation engineering.

In the waste oil boiler taught by Stauffer et al. (U.S. Pat. No. 6,085,701), combustion flame 156 is fired toward the back wall of combustion chamber 147. Applicant prefers that, in applicant's waste-oil-fired coil tube boiler 155, working fluid heat exchanger 136 is introduced into combustion chamber 147 through back wall 157 (as apposed to Smoker et al. and Stauffer et al., for example), thereby permitting a portion of the heat energy from combustion flame 156 to be transferred to Stirling-cycle engine 134, as shown. Preferably, the configuration of working fluid heat exchanger 136 is such that combustion flame 156 is directed back in combustion chamber 147, thereby maintaining the overall efficiency of the combustion and secondary heat transfer process, as shown (at least embodying herein wherein such combustion heat produced by such at least one combustion heater comprises at least one directed heat flow; at least one portion of such at least one primary heat exchanger is positioned to be in thermal communication with such at least one directed heat flow; and such at least one primary heat exchanger is structured and arranged to direct at least one portion of such at least one directed heat flow to such at least one secondary heat exchanger). Upon reading this specification, those with ordinary skill in the art will understand that, under appropriate circumstances, such as, to accommodate specific furnace thermal performance characteristics, user preference, advances in technology, etc., other positions of the working fluid heat exchanger within the combustion chamber, such as, for example, non-concentric, front mounted, etc., may suffice.

As a preferred example embodiment, Stirling-cycle engine 134 may comprise a 480 cc four-piston alpha configuration, such as Model STM 4-120 produced by Stirling Thermal Motors, Inc. Using a waste oil burner having a combustion flame temperature of approximately 1,400 degrees Fahrenheit (as measured at working fluid heat exchanger 136), Stirling-cycle engine 134 produces about 40 hp at an average shaft speed of about 1800 rpm. Preferably, Stirling-cycle engine 134 is coupled to an induction-type electrical generator 138, preferably having a rated electrical output (after inverter processing) of 25 kW at 480 VAC/3-phase at 60 Hz. Further, Stirling-cycle engine 134 preferably produces up to 150,000 BTUs/Hr of additional hot water from the engine's internal coolant circuit delivered through Stirling engine coolant lines 172, as shown. It should be noted that, under appropriate circumstance, other Stirling-cycle engine/generator designs may be used within the above-described embodiments, for example, the Stirling engine/generator combinations produced by the Stirling Technology Company of Kennewick, Wash., U.S.A.

Figure 10:
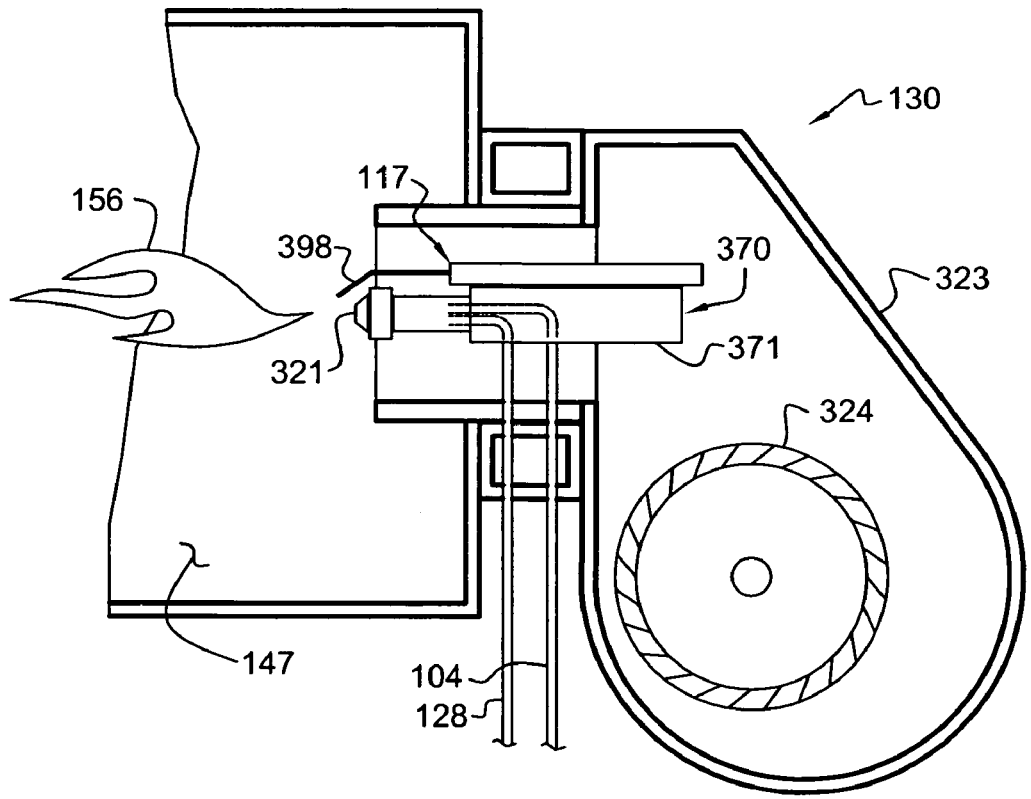
FIG. 10 is a sectional view through a typical waste oil combustor according to a preferred embodiment of the present invention.

FIG. 10 is a sectional view through typical waste oil combustor 130 according to the preferred embodiments of the present invention. It is noted that the configuration and operation of waste oil combustors (such as waste oil combustor 130) is described in greater detail in, for example, U.S. Pat. No. 6,048,197 to Beiler, incorporated herein by reference for further examples of implementation engineering.

As generally discussed in Bieler, waste oil combustor 130 includes burner nozzle 321 and ignition assembly 117 to create a flame from the supplied waste oil 104, as shown. Preferably, waste oil combustor 130 also includes housing 323 in which is mounted fan 324 to supply large quantities of combustion air over nozzle 321 and ignition assembly 117 to support the creation of flame 156 in combustion chamber 147, as shown.

Preferably, burner nozzle assembly 370 includes burner nozzle 321 and ignition assembly 117 (at least embodying herein at least one igniter structured and arranged to ignite such on-site-generated environmentally hazardous waste oils after such on-site-generated environmentally hazardous waste oils have passed through such at least one atomizer), as shown. Preferably, burner nozzle 321 includes nozzle housing 371 having passageways for the flow of compressed air 128 and waste oil 104 in a known manner to create a flame projected into combustion chamber 147.

Preferably, preheated waste oil 104 flows into burner nozzle 321 (at least embodying herein embodying herein atomizer means for atomizing such on-site-generated environmentally hazardous waste oils prior to combustion, and at least embodying herein at least one atomizer structured and arranged to atomize such on-site-generated environmentally hazardous waste oils prior to combustion) to exit in a fine stream. Meanwhile, preheated compressed air 128 preferably flows through another passageway into burner nozzle 321 where the flow of compressed air 128 is directed in a slightly spiraled path. Preferably, compressed air 128 and waste oil 104 are combined at the tip of burner nozzle 321 to effect an atomizing of the waste oil stream, resulting in a combined stream of compressed air and atomized waste oil droplets being ejected from the tip, whereupon it is ignited into a flame by the electrodes 398, of ignition assembly 117.

It should be noted that the term "environmentally hazardous waste oils", as used within this specification and the below claims, shall include within the definition, vegetable oils and similar oils used within the food industry. Furthermore, upon reading this specification, those with ordinary skill in the art will understand that, under appropriate circumstances, such as, for example, new industries, advances in processing technology, etc., the use of other oils, such as, synthetic oil, bio-engineered oils, etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A system related to on-site burning of on-site-generated environmentally hazardous waste oils for the purpose of on-site electrical power generation, said system comprising:
   a) at least one holder structured and arranged to hold such on-site-generated environmentally hazardous waste oils;
   b) at least one combustion heater structured and arranged to produce combustion heat by burning such on-site-generated environmentally hazardous waste oils;
   c) at least one waste oil transfer component structured and arranged to transfer such on-site-generated environmentally hazardous waste oils from said at least one holder to said at least one combustion heater;
   d) at least one heat energy converter structured and arranged to convert such combustion heat to electrical power;
   e) at least one primary heat exchanger structured and arranged to transfer such combustion heat to said at least one heat energy converter; and f) at least one on-site electrical circuit adapted to utilize the electrical power;

g) wherein said at least one primary heat exchanger is in operational communication with said at least one combustion heater; and h) wherein said at least one combustion heater comprises:
   i) at least one atomizer structured and arranged to atomize such on-site-generated environmentally hazardous waste oils prior to combustion; and
   ii) at least one igniter adapted to ignite such on-site-generated environmentally hazardous waste oils after such environmentally hazardous waste oils have passed through said at least one atomizer.

2. The system according to claim 1 wherein said at least one heat energy converter comprises at least one thermocouple-based electrical power generator adapted to generate the electrical power utilizing the combustion heat.

3. The system according to claim 1 wherein said at least one heat energy converter comprises at least one thermophotovoltaic electrical power generator adapted to generate the electrical power utilizing the combustion heat.

4. The system according to claim 1 wherein said at least one heat energy converter comprises:
   a) at least one heat-driven gasification generator adapted to generate at least one fuel gas utilizing the combustion heat; and
   b) at least one fuel cell adapted to generate electrical power utilizing such at least one fuel gas.

5. The system according to claim 1 wherein said at least one heat energy converter comprises:
   a) at least one heat-to-mechanical power converter adapted to convert such combustion heat to mechanical power; and
   b) operationally coupled to said at least one heat-to-mechanical power converter, at least one electrical generator adapted to the generate electrical power.

6. The system according to claim 5 wherein said at least one heat-to-mechanical power converter comprises at least one Stirling-cycle engine structured and arranged to use the mechanical output of at least one Stirling cycle to produce mechanical power.

7. The system according to claim 5 wherein said at least one heat-to-mechanical power converter comprises at least one steam powered turbine adapted to convert steam pressure to mechanical power.

8. The system according to claim 5 wherein said at least one heat-to-mechanical power converter comprises at least one hydrocarbon vapor turbine adapted to convert at least one hydrocarbon vapor pressure to mechanical power.

9. The system according to claim 1 wherein said at least one on-site electrical circuit comprises at least one electrical network connected to at least one larger electrical grid.

10. The system according to claim 9 wherein said at least one electrical network further comprises at least one electrical controller structured and arranged to control electrical power within said at least one electrical network.

11. The system according to claim 9 wherein said at least one electrical controller is structured and arranged to control transfers of electrical power between said at least one electrical network and the at least one larger electrical grid.

12. The system according to claim 9 wherein:
   a) said at least one electrical network further comprises at least one electrical storage device structured and arranged to store electrical power; and
   b) said at least one electrical controller is structured and arranged to control at least one transfer of electrical power between said at least one electrical storage device and said at least one electrical network.

13. The system according to claim 1 further comprising at least one secondary heat exchanger structured and arranged to transfer at least one portion of the combustion heat to at least one heatable fluid.

14. The system according to claim 13 wherein said at least one secondary heat exchanger is structured and arranged to transfer heat to air, usable for space heating.

15. The system according to claim 14 wherein the heatable fluid comprises at least one liquid.

16. The system according to claim 1 wherein said at least one holder comprises at least one collector structured and arranged to assist in collecting such on-site-generated environmentally hazardous waste oils.

17. The system according to claim 13 wherein:
   a) such combustion heat produced by said at least one combustion heater comprises at least one directed heat flow;
   b) at least one portion of said at least one primary heat exchanger is positioned to be in thermal communication with such at least one directed heat flow; and
   c) said at least one primary heat exchanger is structured and arranged to direct at least one portion of such at least one directed heat flow to at least one portion of said at least one secondary heat exchanger.

18. The system according to claim 1 wherein said at least one waste oil transfer component comprises:
   a) at least one pump to pump such on-site-generated environmentally hazardous waste oils from said at least one holder to said at least one combustion heater;
   b) at least one flow volume regulator adapted to regulate the flow volume of such on-site-generated environmentally hazardous waste oils pumped from said at least one holder to said at least one combustion heater; and
   c) at least one pre-heater structured and arranged to preheat such environmentally hazardous waste oils prior to burning.

19. The system according to claim 1 wherein:
   a) said at least one combustion heater comprises a maximum capacity of not more than 0.5 million BTU input per hour; and
   b) combustion gasses produced by the combustion of such on-site-generated environmentally hazardous waste oils are substantially vented to the ambient air.

20. A system related to on-site burning of on-site-generated environmentally hazardous waste oils for the purpose of on-site electrical power generation, said system comprising:
   a) at least one holder structured and arranged to hold such on-site-generated environmentally hazardous waste oils;
   b) at least one combustion heater structured and arranged to produce combustion heat by burning such on-site-generated environmentally hazardous waste oils;
   c) at least one waste oil transfer component structured and arranged to transfer such on-site-generated environmentally hazardous waste oils from said at least one holder to said at least one combustion heater;
   d) at least one heat energy converter structured and arranged to convert such combustion heat to electrical power; and
   e) at least one primary heat exchanger structured and arranged to transfer such combustion heat to said at least one heat energy converter;

f) wherein said at least one holder comprises at least one collector structured and arranged to assist in on-site collecting of such on-site-generated environmentally hazardous waste oils;
g) wherein said at least one waste oil transfer component comprises
   i) at least one pump to pump such on-site-generated environmentally hazardous waste oils from said at least one holder to said at least one combustion heater,
   ii) at least one flow volume regulator adapted to regulate the flow volume of such on-site-generated environmentally hazardous waste oils pumped from said at least one holder to said at least one combustion heater, and
   iii) at least one pre-heater structured and arranged to preheat such environmentally hazardous waste oils prior to burning;
h) wherein said at least one primary heat exchanger is in operational communication with said at least one combustion heater; and
i) wherein said at least one combustion heater comprises:
   i) at least one atomizer structured and arranged to atomize such on-site-generated environmentally hazardous waste oils prior to combustion; and
   ii) at least one igniter adapted to ignite such on-site-generated environmentally hazardous waste oils after such environmentally hazardous waste oils have passed through said at least one atomizer.

21. The system according to claim 20 further comprising:
a) at least one secondary heat exchanger structured and arranged to transfer at least one portion of the combustion heat to at least one heatable fluid;
b) wherein such combustion heat produced by said at least one combustion heater comprises at least one directed heat flow;
c) wherein at least one portion of said at least one primary heat exchanger is positioned to be in thermal communication with such at least one directed heat flow; and
d) wherein said at least one primary heat exchanger is structured and arranged to direct at least one portion of such at least one directed heat flow to at least one portion of said at least one secondary heat exchanger.

22. The system according to claim 21 further comprising at least one on-site electrical circuit adapted to utilize the electrical power.

23. The system according to claim 22 wherein:
a) said at least one on-site electrical circuit comprises at least one electrical network connected to at least one larger electrical grid;
b) said at least one electrical network comprises at least one electrical controller structured and arranged to control electrical power within said at least one electrical network; and
c) said at least one electrical controller is structured and arranged to control transfers of electrical power between said at least one electrical network and the at least one larger electrical grid.

24. The system according to claim 23 wherein:
a) said at least one electrical network further comprises at least one electrical storage device structured and arranged to store electrical power; and
b) said at least one electrical controller is structured and arranged to control at least one transfer of electrical power between said at least one electrical storage device and said at least one electrical network.

25. The system according to claim 24 wherein said at least one heat energy converter comprises at least one thermocouple-based electrical power generator adapted to generate the electrical power utilizing the combustion heat.

26. The system according to claim 24 wherein said at least one heat energy converter comprises: at least one thermophotovoltaic electrical power generator adapted to generate the electrical power utilizing the combustion heat.

27. The system according to claim 24 wherein said at least one heat energy converter comprises:
a) at least one heat-driven gasification generator adapted to generate at least one fuel gas utilizing the combustion heat; and
b) at least one fuel cell adapted to generate electrical power utilizing such at least one fuel gas.

28. The system according to claim 24 wherein said at least one heat energy converter comprises:
a) at least one heat-to-mechanical power converter adapted to convert such combustion heat to mechanical power; and
b) operationally coupled to said at least one heat-to-mechanical power converter, at least one electrical generator adapted to the generate electrical power.

29. The system according to claim 28 wherein said at least one heat-to-mechanical power converter comprises at least one Stirling-cycle engine structured and arranged to use the mechanical output of at least one Stirling cycle to produce mechanical power.

30. The system according to claim 28 wherein said at least one heat-to-mechanical power converter comprises at least one steam powered turbine adapted to convert steam pressure to mechanical power.

31. The system according to claim 28 wherein said at least one heat-to-mechanical power converter comprises at least one hydrocarbon vapor turbine adapted to convert at least one hydrocarbon vapor pressure to mechanical power.

32. The system according to claim 21 wherein said at least one secondary heat exchanger is structured and arranged to transfer heat to air, usable for space heating.

33. The system according to claim 21 wherein the heatable fluid comprises at least one liquid.

* * * * *